(12) United States Patent
Araki

(10) Patent No.: US 10,482,233 B2
(45) Date of Patent: Nov. 19, 2019

(54) DEVICE, AUTHENTICATION SYSTEM, AUTHENTICATION PROCESSING METHOD, AND COMPUTER PROGRAM PRODUCT

(71) Applicant: RICOH COMPANY, LTD., Tokyo (JP)

(72) Inventor: Ryoji Araki, Fukuoka (JP)

(73) Assignee: RICOH COMPANY, LTD., Tokyo (JP)

(*) Notice: Subject to any disclaimer, the term of this patent is extended or adjusted under 35 U.S.C. 154(b) by 412 days.

(21) Appl. No.: 15/073,371

(22) Filed: Mar. 17, 2016

(65) Prior Publication Data

US 2016/0275282 A1 Sep. 22, 2016

(30) Foreign Application Priority Data

Mar. 20, 2015 (JP) ................................ 2015-058789

(51) Int. Cl.
*G06F 21/34* (2013.01)
*H04L 29/06* (2006.01)
*G06F 21/31* (2013.01)
*G06F 21/45* (2013.01)

(52) U.S. Cl.
CPC .............. *G06F 21/34* (2013.01); *G06F 21/31* (2013.01); *G06F 21/45* (2013.01); *H04L 63/0853* (2013.01)

(58) Field of Classification Search
CPC .......... G06F 21/34; G06F 21/31; G06F 21/45; H04L 63/0853
See application file for complete search history.

(56) References Cited

U.S. PATENT DOCUMENTS

| 5,267,315 | A  | * | 11/1993 | Narita ................. | G06Q 20/346 705/67 |
| 6,651,168 | B1 | * | 11/2003 | Kao ....................... | G06F 21/32 713/155 |
| 9,367,780 | B2 | * | 6/2016  | Urasawa ............ | G06K 15/4095 |
| 9,742,770 | B2 | * | 8/2017  | Belton, Jr. ............. | H04L 63/08 |
| 9,852,275 | B2 | * | 12/2017 | Sambamurthy ......... | G06F 21/31 |
| 2002/0046338 | A1 | * | 4/2002 | Ueda .................. | G06Q 20/3674 713/168 |
| 2003/0177363 | A1 | * | 9/2003 | Yokota .................... | G06F 21/33 713/176 |
| 2005/0223233 | A1 | * | 10/2005 | Ishidera ................. | G06F 21/34 713/185 |

(Continued)

FOREIGN PATENT DOCUMENTS

JP 5354665 9/2013
JP 2013-222351 10/2013

OTHER PUBLICATIONS

European search report dated Feb. 8, 2018 in connection with corresponding European patent application No. 16761319.9.
Office Action dated Apr. 30, 2019 in U.S. Appl. No. 15/556,105.

*Primary Examiner* — Saleh Najjar
*Assistant Examiner* — Devin E Almeida
(74) *Attorney, Agent, or Firm* — Xsensus LLP

(57) ABSTRACT

A first creator creates a first priority user information. When an installer installs a program that has a user authentication function, a second creator creates a second priority user information for use in the installed program separately from the first priority user information. An authenticator performs user authentication of the installed program using the created second priority user information.

11 Claims, 14 Drawing Sheets

(56) References Cited

U.S. PATENT DOCUMENTS

| | | |
|---|---|---|
| 2006/0215201 A1 | 9/2006 | Shimizu et al. |
| 2006/0271781 A1 | 11/2006 | Murakawa |
| 2007/0008583 A1 | 1/2007 | Araki |
| 2008/0209569 A1 | 8/2008 | Araki |
| 2008/0283592 A1* | 11/2008 | Oder, II ................. G06Q 20/20 235/380 |
| 2009/0055925 A1* | 2/2009 | Masui ..................... G06F 21/34 726/20 |
| 2010/0077457 A1* | 3/2010 | Xu ........................ H04L 63/105 726/4 |
| 2010/0205449 A1* | 8/2010 | Eun ..................... G06Q 20/341 713/185 |
| 2011/0041144 A1 | 2/2011 | Araki |
| 2011/0225600 A1 | 9/2011 | Araki |
| 2012/0212779 A1 | 8/2012 | Araki |
| 2012/0216062 A1 | 8/2012 | Araki |
| 2013/0254903 A1 | 9/2013 | Araki |
| 2013/0333002 A1* | 12/2013 | Belton .................... H04L 63/08 726/5 |
| 2014/0229931 A1 | 8/2014 | Araki |
| 2014/0245414 A1 | 8/2014 | Eun |
| 2014/0282877 A1* | 9/2014 | Mahaffey ............ H04L 63/0853 726/3 |
| 2015/0074667 A1 | 3/2015 | Araki |
| 2015/0264211 A1 | 9/2015 | Araki |
| 2016/0275282 A1* | 9/2016 | Araki ...................... G06F 21/34 |
| 2017/0277879 A1* | 9/2017 | Taniguchi ............... G06F 21/34 |
| 2018/0046791 A1 | 2/2018 | Eun |

* cited by examiner

US 10,482,233 B2

DEVICE, AUTHENTICATION SYSTEM, AUTHENTICATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2015-058789 filed in Japan on Mar. 20, 2015.

BACKGROUND OF THE INVENTION

1. Field of the Invention

The present invention relates to a device, an authentication system, an authentication processing method, and a computer program product.

2. Description of the Related Art

In a case where a user other than a system administrator registers authentication information that includes information on an IC card used for authentication in a multifunction peripheral, the following process can be provided. When the multifunction peripheral receives a request for registering user information from a client device operated by the user, the multifunction peripheral stores the user information transmitted with the registration request.

Unfortunately, however, the above-described configuration requires a request for registering the authentication information by the user. This drawback will be commonplace in a variety of electronic devices that require user authentication.

In view of the foregoing situation, there is a need to provide a device, an authentication system, an authentication processing method, and a computer program product that eliminate complications involved in registering user authentication information and enable efficient user authentication.

SUMMARY OF THE INVENTION

It is an object of the present invention to at least partially solve the problems in the conventional technology.

According to exemplary embodiments of the present invention, there is provided a device comprising: a first unit; and a second unit, the first unit including: a function provider that provides a predetermined function; a first storage controller that stores authentication information used for user authentication in a first storage; and a provision controller that controls the function provider to provide the predetermined function when a user authentication result indicating an authorized user is obtained; and the second unit including: a first acquirer that acquires the authentication information before performance of the user authentication; a second storage controller that stores the acquired authentication information in a second storage; a first creator that creates first priority user information and stores the first priority user information in the second storage, the first priority user information representing, of the acquired authentication information, authentication information corresponding to a user who has been authenticated in user authentication as an authorized user, to which user authentication time information is added; an installer that installs a program that becomes usable through user authentication in the second storage; a second creator that creates the second priority user information separately from the first priority user information and stores the second priority user information in the second storage, the second priority user information being used for the installed program; a second acquirer that acquires input information that is input in user authentication; and an authenticator that performs user authentication by collating the input information with the first priority user information or the second user information stored in the second storage and notifies the provision controller of the first unit of a user authentication result.

Exemplary embodiments of the present invention also provide an authentication processing method that acquires, by a second unit, authentication information before performance of user authentication, that collates input authentication information that is input in the second unit with the authentication information used for user authentication, and that provides a predetermined function of a first unit when an authorized user is authenticated, the method comprising: in the first unit, providing, by a function provider, the predetermined function; controlling, by a first storage controller, to store authentication information used for user authentication in a first storage; and controlling the function provider, by a provision controller, to provide the predetermined function when a user authentication result indicating an authorized user is obtained; and in the second unit, acquiring, by a first acquirer, the authentication information before performance of the user authentication; controlling, by a second storage controller, to store the acquired authentication information in a second storage; creating, by a first creator, first priority user information and storing, by the first creator, the first priority user information in the second storage, the first priority user information representing, of the acquired authentication information, authentication information corresponding to a user who has been authenticated in user authentication as an authorized user, to which user authentication time information is added; installing, by an installer, a program that becomes usable through user authentication in the second storage; creating, by a second creator, a second priority user information separately from the first priority user information and storing, by the second creator, the second priority user information in the second storage, the second priority user information being used for the installed program; acquiring, by a second acquirer, input information that is input in user authentication; and performing, by an authenticator, user authentication by collating the input information with the first priority user information or the second user information stored in the second storage and notifying, by the authenticator, the provision controller of the first unit of a user authentication result.

Exemplary embodiments of the present invention also provide a computer program product comprising a non-transitory computer-readable recording medium that contains an authentication processing program, wherein the authentication processing program causes a computer of a first unit to function as: a first storage controller that stores authentication information used for user authentication in a first storage; and a provision controller that controls a function provider to provide a predetermined function when a user authentication result indicating an authorized user is obtained; and the authentication processing program causes a computer of a second unit to function as: a first acquirer that acquires the authentication information before performance of the user authentication; a second storage controller that stores the acquired authentication information in a second storage; a first creator that creates first priority user information and stores the first priority user information in the second storage, the first priority user information representing, of the acquired authentication information, authentication information corresponding to a user who has been authenticated in user authentication as an authorized user, to which user authentication time information is added; an installer that installs a program that becomes usable through user authentication in the second storage; a second creator that creates the second priority user information separately from the first priority user information and stores the second priority user information in the second storage, the second priority user information being used for the installed program; a second acquirer that acquires input information that is input in user authentication; and an authenticator that performs user authentication by collating the input information with the first priority user information or the second user information stored in the second storage and notifies the provision controller of the first unit of a user authentication result.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In embodiments to which the present invention is applied, the multifunction peripheral, having received the registration request for the user information through the operating instruction from the user, receives inputs of a user name and a password. The multifunction peripheral, having determined that the user information having a set of the received user name and password had been registered in a user information control table, prepares authentication information that associates the IC card information acquired through a card reader with the user information and stores the prepared authentication information in an authentication information table. The foregoing procedure enables a user other than the system administrator to register authentication information with secured system security.

The following details, with reference to the accompanying drawings, a multifunction peripheral or an authentication system according to embodiments to which the present invention is applied.

First Embodiment

Figure 1:
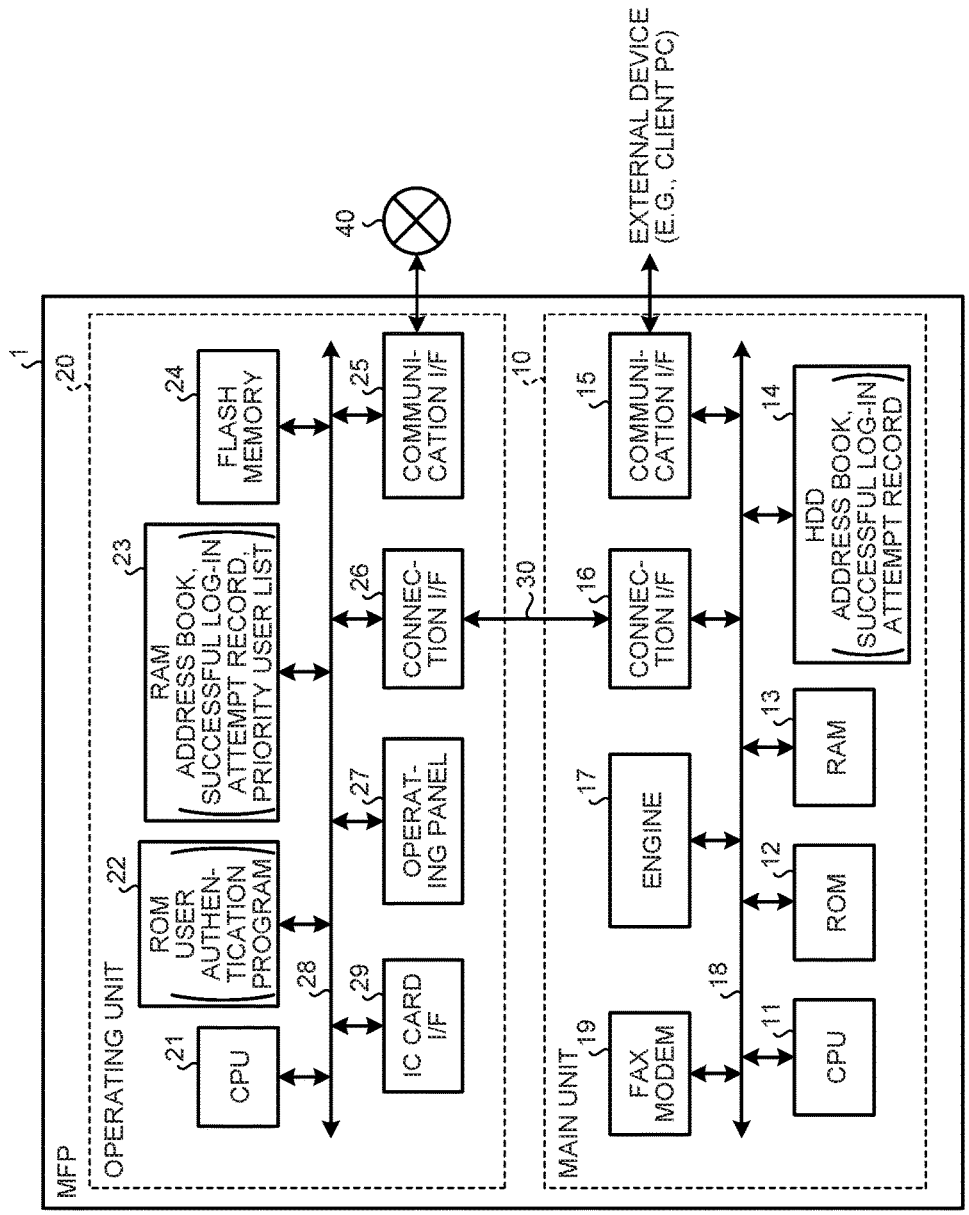
FIG. 1 is a hardware configuration diagram of a MFP according to a first embodiment of the present invention.

FIG. 1 is a hardware configuration diagram of a multifunction peripheral (MFP) 1 according to a first embodiment of the present invention. The MFP 1 is an exemplary device and authentication system. The MFP 1 includes a main unit 10 and an operating unit 20 as illustrated in FIG. 1. Specifically, the main unit 10 has various functions including a copier function, a scanner function, a facsimile function, and a printer function. The operating unit 20 receives inputs in accordance with user operations. The main unit 10 is an exemplary first unit and the operating unit 20 is an exemplary secondary unit.

The main unit 10 and the operating unit 20 are connected to each other via a dedicated communication path 30 so as to be capable of communicating with each other. For the communication path 30, a type that complies with, for example, the universal serial bus (USB) standard may be used. Alternatively, a type that complies with any other standard may be used regardless of whether it be wired or wireless. Additionally, the main unit 10 may have one or a plurality of functions out of image forming functions including the copier function, the scanner function, the facsimile function, and the printer function.

A stand-alone electronic device capable of performing information processing may be used for the operating unit 20. Examples of the operating unit 20 include, but are not limited to, an information processing terminal such as a smartphone and a tablet type terminal. In this case, the information processing terminal used as the operating unit 20 functions as an operating unit of the MFP 1.

More specifically, the information processing terminal used as the operating unit 20 is attachably and removably connected to the MFP 1 in place of an operating panel that has hitherto been fixedly disposed on the MFP 1 as a dedicated operating unit. Specifically, the information processing terminal used as the operating unit 20, although being removable (detachable) from a predetermined position such as a designated position at which the operating panel of the MFP 1 is to be disposed, is integrated with the MFP 1.

Thus, the information processing terminal used as the operating unit 20 and the MFP 1 may be regarded as a single apparatus. The information processing terminal as the operating unit 20, when removed from the MFP 1, functions as the operating unit of the MFP 1 by performing wireless communication with the MFP 1 through, for example, Bluetooth (registered trademark) or infrared communication.

The main unit 10 operates in accordance with an input received at the operating unit 20. In addition, the main unit 10 can also communicate with an external device such as a client PC (personal computer) and operates in accordance with an instruction received from the external device.

Hardware Configuration of Main Unit

The following describes a hardware configuration of the main unit 10. As illustrated in FIG. 1, the main unit 10 includes a CPU 11, a ROM 12, a RAM 13, and a hard disk drive (HDD) 14. The main unit 10 further includes a communication interface (I/F) 15, a connection I/F 16, an engine 17, and a facsimile modem (FAX modem) 19. The elements 11 to 17 and the FAX modem 19 are connected to each other via a system bus 18.

The CPU 11 integrally controls operations of the main unit 10. The CPU 11 uses the RAM 13 as a work area to execute a program stored in, for example, the ROM 12 or the HDD 14, thereby controlling general operations of the main unit 10 and achieving the various functions including the copier function, the scanner function, the facsimile function, and the printer function mentioned previously.

The communication I/F 15 is an interface for communicating an external device such as a client personal computer (PC), a Web server device, or an authentication server device on a network 40. The connection I/F 16 is an interface for communicating with the operating unit 20 via the communication path 30. Although the communication path 30 is illustrated as being wired in FIGS. 1 and 2, the operating unit 20 is attachable and removable with respect to the main unit 10 of the MFP 1 as described previously. As a result, the communication path 30 may alternatively be something that functions as a wired communication path when the operating unit 20 is mounted on the MFP 1 and as a wireless communication path when the operating unit 20 is removed from the MFP 1.

The engine 17 is hardware that performs general-purpose information processing and other types of processing excluding communication for achieving the copier function, the scanner function, the facsimile function, and the printer function. The engine 17 includes, for example, a scanner (image reader) that scans to read an image of a document, a plotter (image generator) that performs printing on a sheet material such as paper, and a facsimile communicator that performs facsimile communication. The engine 17 may even be configured with a specific option such as a finisher that sorts printed sheet materials and an automatic document feeding device (ADF) that automatically feeds documents.

The HDD 14 has storage spaces storing an address book and successful login attempt record information, respectively. The storage space for the address book stores therein, for each user, master information that is generated by associating therewith user identification information (user ID) of a user who is authorized to use the MFP 1, and a card ID and a password of an IC card lent (issued) to the user, for example. The storage space for the successful login attempt record stores therein time and date on which an operation of the MFP 1 is permitted as a result of a login attempt, associated with a card ID of an IC card used for the login attempt and a user ID of a user corresponding to the card ID, and the like. The master information and the like may be stored in a recording medium such as an SD card (registered trademark) and a USB memory. USB is an acronym for "universal serial bus".

The embodiment has been described for an exemplary case of user authentication using the IC card. The same function as when the IC card is used can nonetheless be achieved in an procedure in which a smartphone, a portable telephone, or any other information terminal that has a function used for user authentication (or in which an application has previously been installed) is used as an authentication device. Additionally, the embodiment will hereunder be described as using the "IC card" for user authentication. Any type of storage medium that can store user information may nonetheless be used. Thus, the IC card, an ID card, or the like is not the only possible storage medium.

Hardware Configuration of Operating Unit

The following describes a hardware configuration of the operating unit 20. As illustrated in FIG. 1, the operating unit 20 includes a CPU 21, a ROM 22, a RAM 23, a flash memory 24, a communication I/F 25, a connection I/F 26, an operating panel 27, and an IC card I/F 29. These elements are connected to each other via a system bus 28.

The CPU 21 integrally controls operations of the main operating unit 20. The CPU 21 uses the RAM 13 as a work area to execute a program stored in, for example, the ROM 22, thereby controlling general operations of the operating unit 20. In addition, the CPU 21 executes, as will be described later, a user authentication program stored in, for example, the ROM 22 to thereby achieve a user authentication operation to be described later.

The communication I/F 25 is, for example, an interface for communicating with an authentication server device on the network 40. The connection I/F 26 is an interface for communicating with the main unit 10 via the communication path 30. The IC card I/F 29 is a card reader that reads information stored in the IC card through noncontact wireless communication. The IC card I/F 29 performs noncontact wireless communication with the IC card held up by the user during a login attempt made with respect to the MFP 1, thereby reading the card ID and the like stored in the IC card.

The RAM 23 (or the flash memory 24 or any other storage) has a storage space for storing each of an address book, a successful login attempt record, and a priority user list. The storage space for the address book stores the master information of the address book acquired from the HDD 14 of the main unit 10. It is noted that the master information acquired from the main unit 10 may be stored in a recording medium such as an SD card (registered trademark) and a USB memory. The storage space for the successful login attempt record in the RAM 23 stores the successful login attempt record acquired from the HDD 14 of the main unit 10.

The storage space for the priority user list of the successful login attempt record in the RAM 23 stores, out of the successful login attempt record acquired from the HDD 14, a predetermined number of pieces of successful login attempt record information that includes the user ID, the card ID, and the login time and date in order of the login time and date. The priority user list represents a list of users subject to user authentication.

The "priority user" refers to a user corresponding to the successful login attempt record acquired from the HDD 14 of the main unit 10. Specifically, as will be described later, the MFP 1 in the present embodiment acquires the successful login attempt record for a predetermined number of latest users out of the successful login attempt record stored in the HDD 14 of the main unit 10. Each of users corresponding to the predetermined number of users on the successful login attempt record can complete his or her user authentication for use of the functions of the MFP 1 by simply holding up the IC card. The users corresponding to the successful login attempt record acquired from the HDD 14 will thus be referred to as "priority users" in the MFP 1 of the present embodiment because they can preferentially use the functions of the MFP 1.

When the card ID read from the IC card during the login attempt has been registered in the priority user list, the CPU 21 of the operating unit 20 performs user authentication for an authorized user and enables use of the functions of the MFP 1 corresponding to user authority. This procedure allows the user authentication procedure to be completed within a period of several msec after the holding up of the IC card during the login attempt, thereby enabling the use of the MFP 1.

The operating panel 27 includes a liquid crystal display device (LCD) including a touch sensor. The operating panel 27 receives various inputs in accordance with an operation by the user. The operating panel 27 further displays various types of information including, for example, information corresponding to the received input, information indicating an operating status of the MFP 1, and information indicating a setting condition. It is noted that the operating panel 27 may include an organic EL display device including a touch sensor. Additionally, the operating panel 27 may include, in addition to or in place of the foregoing, a hardware key or other operating unit or a light-emitting or other display unit.

Software Configuration of MFP

Figure 2:
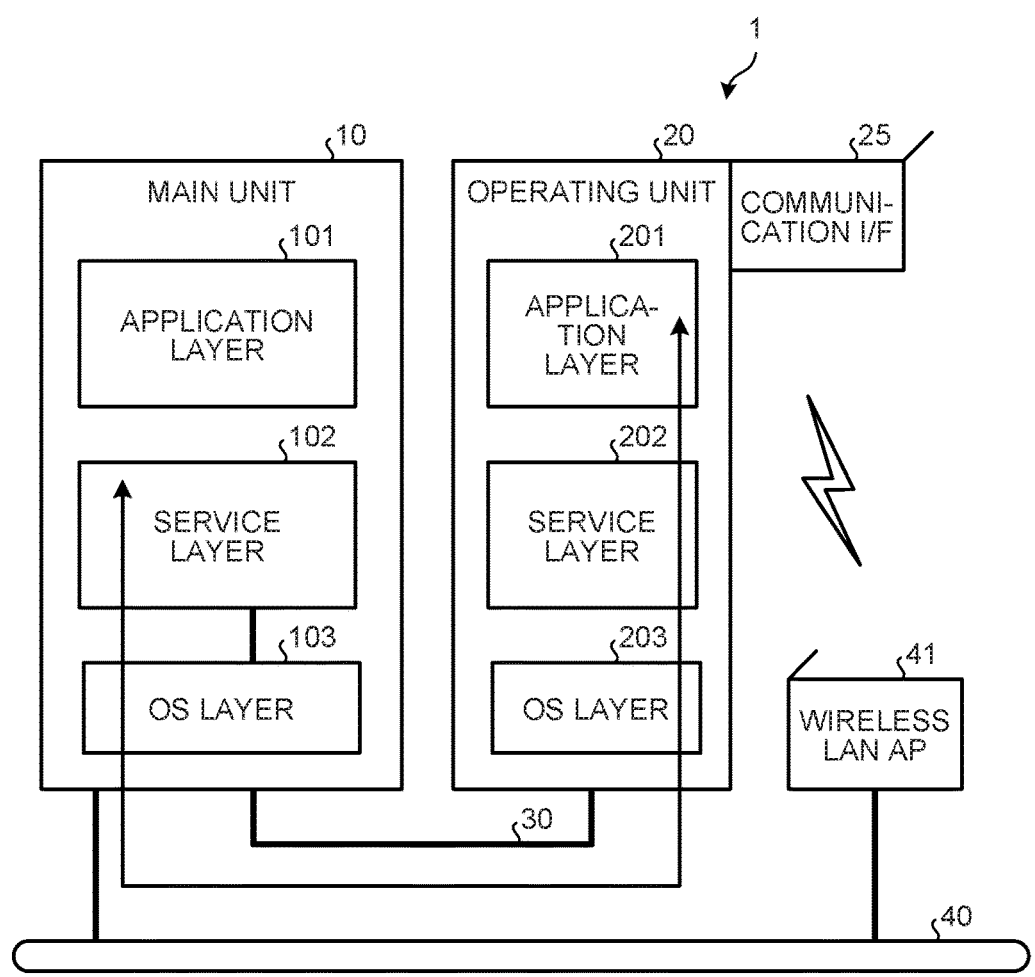
FIG. 2 is a software configuration diagram of the MFP according to the first embodiment.

FIG. 2 illustrates an exemplary software configuration of the MFP 1. As illustrated in FIG. 2, the main unit 10 includes an application layer 101, a service layer 102, and an OS layer 103. The application layer 101, the service layer 102, and the OS layer 103 are, in reality, various types of software stored in, for example, the ROM 12 or the HDD 14. The CPU 11 executes these pieces of software to thereby provide respective functions.

The application layer 101 software is application software (may be referred to simply as an "application" in the following) for operating hardware resources to thereby provide certain functions. Examples of the applications include, but are not limited to, a copier application for providing the copier function, a scanner application for providing the scanner function, a facsimile application for providing the facsimile function, and a printer application for providing the printer function.

The service layer 102 software is disposed between the application layer 101 and the OS layer 103 and provides an application with an interface for using a hardware resource of the main unit 10. Specifically, the service layer 102 software receives an operation request with respect to a hardware resource and provides a function of reconciling operation requests. Examples of the operation requests received by the service layer 102 include, but are not limited to, reading by the scanner and printing by the plotter.

The interface function by the service layer 102 is provided for not only the application layer 101 of the main unit 10, but also an application layer 201 of the operating unit 20. The application layer 201 (application) of the operating unit 20 can also achieve a function that uses the hardware resources (e.g., the engine 17) of the main unit 10 via the interface function provided by the service layer 102.

The OS layer 103 software is basic software (operating system) for providing a basic function of controlling the hardware of the main unit 10. The service layer 102 software converts a request for using a hardware resource from each of different applications to a command that can be interpreted by the OS layer 103 and passes the resultant command to the OS layer 103. The OS layer 103 software then executes the command, so that the hardware resource can operate in accordance with the request from the application.

Similarly, the operating unit 20 includes the application layer 201, a service layer 202, and an OS layer 203. The application layer 201, the service layer 202, and the OS layer 203 of the operating unit 20 have a hierarchical structure similar to a hierarchical structure of the main unit 10. Functions provided by the applications of the application layer 201 and types of operation requests to be received by the service layer 202, however, differ from those on the main unit 10 side. The applications of the application layer 201 are software for operating the hardware resources of the operating unit 20. The software chiefly provides a user interface (UI) function for operating and displaying the functions (the copier function, the scanner function, the facsimile function, and the printer function) of the main unit 10.

It is noted that, in the example of the present embodiment, the OS layer 103 software on the main unit 10 side differs from the OS layer 203 software on the operating unit 20 side with the aim of maintaining independence of the function. Specifically, the main unit 10 and the operating unit 20 operate on their respective operating systems independently of each other. For example, Linux (registered trademark) may be used as the OS layer 103 software on the main unit 10 side and Android (registered trademark) may be used as the OS layer 203 software on the operating unit 20 side.

Causing the main unit 10 and the operating unit 20 to operate on their respective operating systems results in communication between the main unit 10 and the operating unit 20 being performed, not as communication between processes within a common device, but as communication between different devices. This communication corresponds, for example, to an operation (command communication) of transmitting an input (instruction from the user) received by the operating unit 20 to the main unit 10 and an operation of notifying of an event by the main unit 10 to the operating unit 20. The command communication performed by the operating unit 20 with the main unit 10 enables use of the function of the main unit 10. Examples of the event to be notified to the operating unit 20 by the main unit 10 include, but are not limited to, an operation executing status in the main unit 10 and details of setting made on the main unit 10 side.

Additionally, in the example of the present embodiment, power is supplied to the operating unit 20 from the main unit 10 by way of the communication path 30. This configuration allows power supply control for the operating unit 20 to be performed independently of the power supply control for the main unit 10.

While the main unit 10 and the operating unit 20 are electrically and physically connected to each other via the communication path 30 in this example, the operating unit 20 can be removed from the main unit 10 as described previously. In this case, the main unit 10 and the operating unit 20 are provided with a short-range wireless communicator such as, for example, an infrared communicator, a RF communicator, and a Bluetooth (registered trademark) communicator. RF is an acronym for "radio frequency". Alternatively, the main unit 10 and the operating unit 20 may be provided with a wireless LAN communication function such as Wi-Fi (registered trademark) so as to be capable of communicating with each other via a wireless LAN access point (wireless LAN AP) 41 and the network 40 as illustrated in FIG. 2. LAN is an acronym for "local area network". With a configuration of the operating unit 20 being removable from the main unit 10, the operating unit 20 stores electric power supplied from the main unit 10 via the communication path 30 in a secondary battery. The operating unit 20, when removed from the main unit 10, communicates with the main unit 10 as being energized by the electric power stored in the secondary battery.

Functions of Operating Unit

Figure 3:
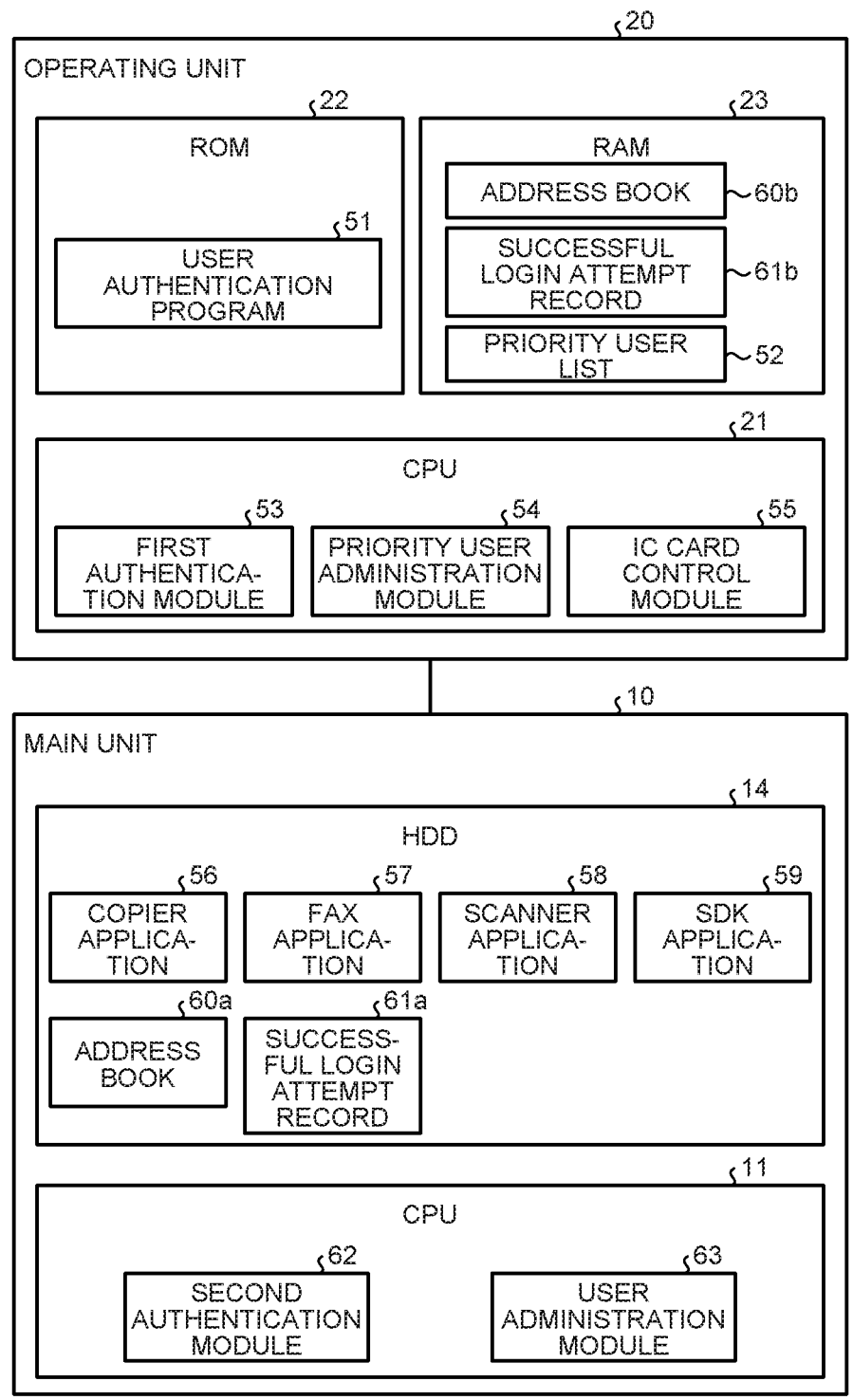
FIG. 3 is a functional block diagram of a main unit and an operating unit of the MFP according to the first embodiment.

FIG. 3 is a functional block diagram of the main unit 10 and the operating unit 20 of the MFP 1. In FIG. 3, the RAM 23 of the operating unit 20 stores an address book 60b and a successful login attempt record 61b that are transferred from the main unit 10 side and a priority user list 52 that represents a list formulated from priority user information generated from the successful login attempt record 61b. The ROM 22 stores a user authentication program 51 that achieves user authentication. The CPU 21 of the operating unit 20 operates in accordance with the user authentication program 51 to thereby function as a first authentication module 53, a priority user administration module 54, and an IC card control module 55. The first authentication module 53 is exemplary authenticator and registration determiner. The priority user administration module 54 is exemplary first acquirer, second storage controller, and first generator. The RAM 23 is an exemplary second storage. The IC card control module 55 is an exemplary second acquirer.

The first authentication module 53 collates the card ID read from the user's IC card during the login attempt with the address book 60b stored in the RAM 23. When the card ID is stored in the address book 60b, the first authentication module 53 performs a user authentication process. When the card ID is not stored in the address book 60b, the first authentication module 53 recognizes the IC card as an IC card that is yet to be registered and is used by a user-authenticated user and performs a process of registering a new IC card.

The priority user administration module 54 controls acquisition and updating of an address book 60a and a successful login attempt record 61a from the main unit 10. The priority user administration module 54 also controls generation and updating of the priority user list 52. The IC card control module 55 controls noncontact wireless communication performed with the IC card via the IC card I/F 29.

It is noted that the user can manually register a user subject to user authentication in the priority user list 52. When a user subject to user authentication is to be manually registered, the priority user administration module 54 stores a card ID, a user ID, and a password that have been manually input of the user subject to user authentication in the address book 60a of the HDD 14 of the main unit 10. In addition, the priority user administration module 54 registers the manually input card ID and user ID of the user subject to user authentication and time and date of the input as successful login attempt time and date information in the priority user list 52.

The current example is described on the assumption that the elements from the first authentication module 53 to the IC card control module 55 are achieved by software using the user authentication program 51. Nonetheless, the elements from the first authentication module 53 to the IC card control module 55 may be achieved, in part or in whole, by hardware such as an integrated circuit (IC).

In addition, the user authentication program 51 may be provided by being recorded on a non-transitory computer-readable recording medium such as a CD-ROM and a flexible disk (FD) in a file in an installable format or an executable format. The user authentication program 51 may be provided by being recorded on a non-transitory computer-readable recording medium such as a CD-R, a DVD, a Blu-ray disc (registered trademark), and a semiconductor memory. DVD is an acronym for "digital versatile disk". The user authentication program 51 may still be provided by being installed over a network such as the Internet. The user authentication program 51 may even be provided by being incorporated in, for example, the ROM of the device in advance.

Functions of Main Unit

Reference is made again to FIG. 3. The HDD 14 of the main unit 10 stores a copier application 56, a FAX application 57, a scanner application 58, an SDK application 59, and various other types of application programs. The copier application 56 is an application program for causing the CPU 11 to control a scanner engine and a plotter engine of the engine 17 to thereby achieve the copier function. The FAX application 57 is an application program for causing the CPU 11 to control the FAX modem 19 to thereby achieve the facsimile function.

The scanner application 58 is an application program for causing the CPU 11 to control the scanner engine of the engine 17 to thereby achieve the scanner function. The SDK application 59 is a package of programs, documents, and the like required for development of software for the MFP 1. SDK is an acronym for "software development kit".

The CPU 11 of the main unit 10 functions as a second authentication module 62 and a user administration module 63 in accordance with a user authentication program (not illustrated) on the main unit 10 side. The user administration module 63 controls writing and reading of the master information to and from the address book 60a of the HDD 14. The user administration module 63 is an exemplary first storage controller. The HDD 14 is an exemplary first storage. The address book 60a is exemplary authentication information used for user authentication. In addition, the user administration module 63 controls writing and reading of the successful login attempt record information to and from the successful login attempt record 61a. The user administration module 63 also controls transfer of the address book 60a and the successful login attempt record 61a to the operating unit 20. The second authentication module 62 performs a user authentication process on the basis of the master information stored in the address book 60a for a user for whom the operating unit 20 cannot perform user authentication.

The current example is described on the assumption that the second authentication module 62 and the user administration module 63 are achieved by software using the user authentication program on the main unit 10 side. Nonetheless, either one or both of the second authentication module 62 and the user administration module 63 may be achieved by hardware such as an integrated circuit (IC).

Additionally, the user authentication program on the main unit 10 side may be provided by being recorded on a non-transitory computer-readable recording medium such as a CD-ROM and a flexible disk (FD) in a file in an installable format or an executable format. The user authentication program on the main unit 10 side may be provided by being recorded on a non-transitory computer-readable recording medium such as a CD-R, a DVD, a Blu-ray disc (registered trademark), and a semiconductor memory. DVD is an acronym for "digital versatile disk". The user authentication program on the main unit 10 side may still be provided by being installed over a network such as the Internet. The user authentication program on the main unit 10 side may even be provided by being incorporated in, for example, the ROM of the device in advance.

User Authentication Operation

Figure 4:
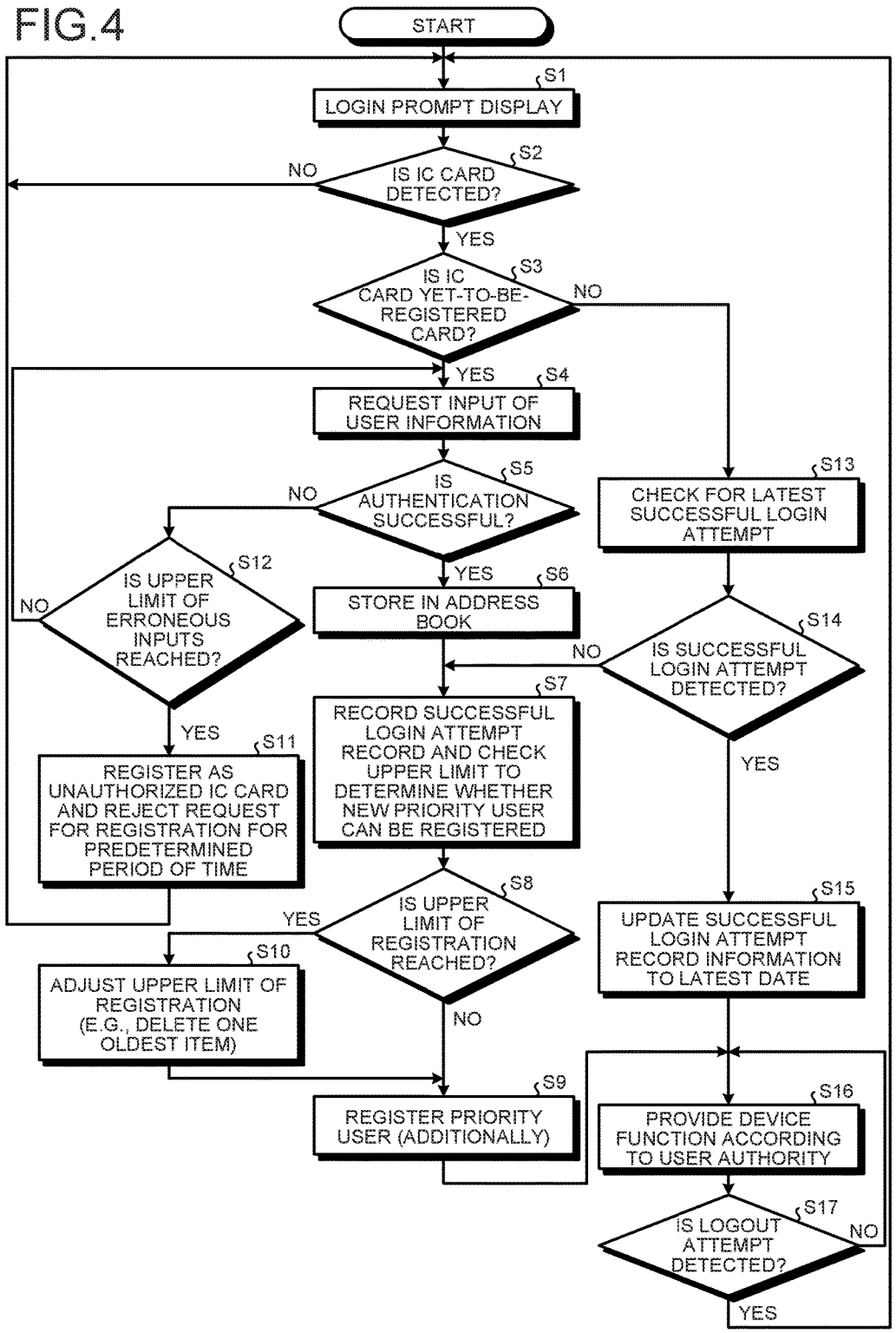
FIG. 4 is a flowchart illustrating steps of a user authentication process performed by the MFP according to the first embodiment.

The following describes, with reference to a flowchart illustrated in FIG. 4, the user authentication process performed by the MFP 1 in the present embodiment. The following prerequisites apply before the user authentication process illustrated in FIG. 4 is performed. Specifically, the priority user administration module 54 of the operating unit 20 acquires the address book 60*a* and the successful login attempt record 61*a* stored in the HDD 14 of the main unit 10 when, for example, the MFP 1 is started (when main power is turned ON), or at a timing immediately before a shift to a power save mode, or at predetermined time intervals, to thereby perform storage control with respect to the RAM 23. It is noted that the address book 60*b* is a duplicate of the address book 60*a* stored on the main unit 10 side. Similarly, the successful login attempt record 61*b* is a duplicate of the successful login attempt record 61*a* stored on the main unit 10 side. Additionally, the priority user administration module 54 acquires from the successful login attempt record 61*b* the successful login attempt record information for each of a predetermined number of users counted from the user of the latest login time and date and stores the successful login attempt record information as information on the users subject to user authentication in the priority user list 52 of the RAM 23. The foregoing prerequisites enable the user authentication process illustrated in the flowchart of FIG. 4 to be performed.

At Step S1 of the flowchart illustrated in FIG. 4, the CPU 21 of the operating unit 20 displays on the operating panel 27 a prompt message that requests performance of a login attempt with respect to the MFP 1. The message may read, for example, "Please log in". The user who wants to use the function of the MFP 1 brings his or her IC card close to the IC card I/F 29 over a distance that enables noncontact wireless communication between the IC card and the IC card I/F 29. This step initiates the noncontact wireless communication between the IC card and the IC card I/F 29.

At Step S2, the IC card control module 55 monitors whether the noncontact wireless communication has been initiated between the IC card and the IC card I/F 29. Upon detection of the initiation of the noncontact wireless communication between the IC card and the IC card I/F 29, the IC card control module 55 determines that the IC card I/F 29 has detected the IC card (Yes at Step S2) and causes the process to proceed to Step S3. It is noted that the IC card control module 55, until it detects the initiation of the noncontact wireless communication between the IC card and the IC card I/F 29 (No at Step S2), continues displaying the login attempt prompt message at Step S1.

Figures 5, 6:
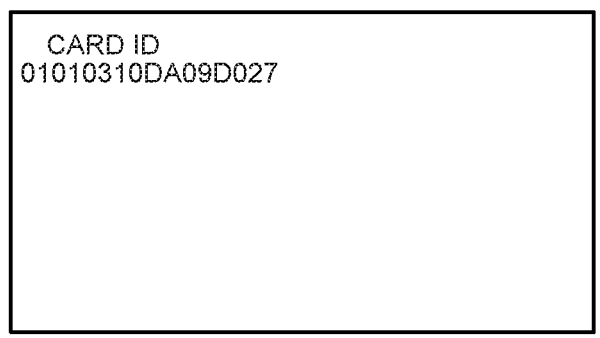
FIG. 5 is a diagram for illustrating a card ID stored in an IC card used in the MFP according to the first embodiment.
FIG. 6 is a diagram for illustrating a successful login attempt record and a priority user list used in the MFP according to the first embodiment.

The IC card stores unique identification information (card ID) as illustrated, for example, in FIG. 5. FIG. 5 illustrates an example of an IC card that stores a card ID of "01010310A09D027". When the noncontact wireless communication with the IC card is enabled, the IC card control module 55 controls the IC card I/F 29 to read the unique identification information (card ID) assigned to the IC card as in the example illustrated in FIG. 5.

The current example has been described to read the card ID from the IC card. The IC card control module 55 may also read other pieces of information that may be stored in the IC card, such as the user ID, together with the card ID, for use in the user authentication to be described hereunder.

At Step S3, the first authentication module 53 collates the read card ID with each piece of master information of the address book 60*b* duplicated in the RAM 23. The first authentication module 53 thereby determines whether the read card ID is registered in the address book 60*b*.

The card ID read from the IC card being registered in the address book 60*b* means that the IC card that is currently used by the user has been registered in the address book 60*a* and the address book 60*b*. In this case, the first authentication module 53 determines that the IC card is not a yet-to-be-registered card (has been registered) (No at Step S3) and causes the process to proceed to Step S13. In contrast, the card ID read from the IC card being not registered in the address book 60*b* means that the IC card that is currently used by the user is a new IC card which is yet to be registered in the address book 60*a* and the address book 60*b*. In this case, the first authentication module 53 determines that the IC card is a yet-to-be-registered card (has not been registered) (Yes at Step S3) and causes the process to proceed to Step S4.

The steps from Step S13 through Step S17 in the flowchart of FIG. 4 represent the user authentication process. The steps from Step S4 through Step S12 represent a new IC card registration process. When the card ID read from the IC card has been registered in the address book 60*b*, the user authentication process from Step S13 through Step S17 is performed. When the card ID read from the IC card is not registered in the address book 60*b*, the new IC card registration process from Step S4 through Step S12 is performed.

New IC Card Registration Process

A shift to the new IC card registration process as a result of the card ID read from the IC card not being registered in the address book 60*b* causes the first authentication module 53 to display on, for example, the operating panel 27 an input screen for a user ID and a password at Step S4. The first authentication module 53 prompts the user who uses the IC card having the card ID not registered to input the user ID and the password. The user operates the operating panel 27 to input in the input screen the user ID and the password used for the registration of another IC card.

Specifically, the MFP 1 in the present embodiment authorizes only authorized users to use the MFP 1. Thus, an authorized user is supposed to have his or her master information that includes a previously registered card ID, a user ID, and a password registered in the address book 60*b* (and the address book 60*a*). Additionally, if an authorized user uses a new IC card, the card ID read from the new IC card is not supposed to have been registered in the address book 60*b*. The foregoing assumptions cause the first authentication module 53 to request the user to input the user ID and the password at Step S4, if the card ID read from the IC card is not registered in the address book 60*b*.

The first authentication module 53 next collates the user ID and the password input by the user with the master information of each user in the address book 60*b*. The user ID and the password input by the user being registered in the address book 60*b* means that this particular user is an authorized user who previously registered using a different IC card in the past. In this case, the first authentication module 53 determines at Step S5 that the authentication has been successful (Yes at Step S5) and the process proceeds to Step S6.

In contrast, if the user ID and the password input by the user are not registered in the address book 60*b*, this particular user is highly likely to be an unauthorized user, although he or she may have input a wrong user ID or/and a wrong password. In this case, the first authentication module 53 determines that the authentication has been unsuccessful (No at Step S5). The process then proceeds to Step S12 and the user is requested to re-input the user ID and the password. The user re-inputs the user ID and the password. Each time the user re-inputs the user ID and the password, the first authentication module 53 collates the user ID and the password with the address book 60b to thereby determine whether the authentication has been successful. The first authentication module 53 also counts an input of a wrong user ID or a wrong password. When the first authentication module 53 counts a predetermined number of inputs of a wrong user ID or a wrong password, for example, three (Yes at Step S12 when an upper limit of erroneous inputs is reached), the process proceeds to Step S11. At Step S11, the first authentication module 53 registers the card ID as the card ID of an unauthorized IC card in the RAM 23 and transfers the card ID to the user administration module 63 of the main unit 10. The user administration module 63 of the main unit 10 registers the transferred card ID as the card ID of an unauthorized IC card in the HDD 14.

The user ID and the password input by the user being registered in the address book 60b means that the user who has input the user ID and the password is an authorized user and the currently used IC card is a new IC card (IC card yet to be registered). In this case, the process proceeds to Step S6 and the priority user administration module 54 as an exemplary second generator registers new master information that is associated with the user ID and the password input by the user in the address book 60b. The process then proceeds to Step S7. The priority user administration module 54 also transfers the new master information to the user administration module 63 of the main unit 10. The user administration module 63 of the main unit 10 registers the new master information in the address book 60a.

At Step S7, the priority user administration module 54 generates successful login attempt record information that associates the card ID of the new IC card and the user ID input by the user with the successful login attempt time and date information that indicates the current time-of-day and date. The user administration module 63 then registers the successful login attempt record information as the successful login attempt record information as of the latest date in the successful login attempt record 61b. Additionally, the priority user administration module 54 transfers the successful login attempt record information as of the latest date to the user administration module 63 of the main unit 10. The user administration module 63 registers the transferred successful login attempt record information as of the latest date in the successful login attempt record 61a.

FIG. 6 is a schematic diagram of the successful login attempt record 61b (and the successful login attempt record 61a). As illustrated in FIG. 6, the user ID and the card ID are associated with the successful login attempt time and date and registered in the successful login attempt record 61 in reverse chronological order. The example illustrated in FIG. 6 indicates that the latest successful login attempt time and date was "14:22, Sep. 8, 2014" and the login attempt was made by the user having a user ID of "user015" and a card ID of "xxxxxxxxxxxxxxxx". The example illustrated in FIG. 6 further indicates that the second latest successful login attempt time and date was "18:35, Sep. 7, 2014" and the login attempt was made by the user having a user ID of "user033" and a card ID of "xxxxxxxxxxxxxxxx". The example illustrated in FIG. 6 further indicates that the third latest successful login attempt time and date was "11:12, Sep. 7, 2014" and the login attempt was made by the user having a user ID of "user001" and a card ID of "xxxxxxxxxxxxxxxx".

Of the successful login attempt record information registered in the successful login attempt record 61b, pieces of successful login attempt record information corresponding to a predetermined number of users are registered as the priority user list 52 in the RAM 23. Specifically, the priority user list 52 has a limited number of users defined to be registered, e.g., 300 users. When, for example, the MFP 1 is started (when the main power is turned ON), or at a timing immediately before a shift to the power save mode, or at predetermined time intervals, the successful login attempt record information for 300 users counted from the user of the latest login time and date is read from the successful login attempt record 61b and registered in the priority user list 52. If the current number of users of the successful login attempt record information registered in the successful login attempt record 61b falls short of the upper limit of registration, e.g., 150 users, the successful login attempt record information for the 150 users currently registered in the successful login attempt record 61b is registered in the priority user list 52.

As such, the priority user list 52 has a defined upper limit of registration. When the new successful login attempt record information has been registered in the successful login attempt record 61b, the priority user list 52 needs to be updated to incorporate therein the new successful login attempt record information. Thus, the priority user administration module 54 determines at Step S7 whether the number of pieces of successful login attempt record information registered in the priority user list 52 reaches the upper limit (the 300 users). If it is determined that the number of pieces of successful login attempt record information registered in the priority user list 52 is yet to reach the upper limit (No at Step S8), the process proceeds to Step S9.

If it is determined that the number of pieces of successful login attempt record information registered in the priority user list 52 has reached the upper limit (Yes at Step S8), the process proceeds to Step S10. At Step S10, the priority user administration module 54 deletes, for example, a specific piece of successful login attempt record information having the oldest successful login attempt time and date from the priority user list 52 and the process proceeds to Step S9. For example, in the example illustrated in FIG. 6, the successful login attempt record information of the user identified by "user003" is deleted.

In the current example, when it is determined that the number of pieces of successful login attempt record information registered in the priority user list 52 has reached the upper limit, the specific piece of successful login attempt record information having the oldest successful login attempt time and date is deleted from the priority user list 52 and a new piece of successful login attempt record information is registered in the priority user list 52. Alternatively, however, when it is determined that the number of pieces of successful login attempt record information registered in the priority user list 52 has reached the upper limit, the successful login attempt record information for a plurality of users, e.g., ten users, counted from the user of the oldest login time and date may be deleted and, thereafter, new pieces of successful login attempt record information may be registered in the priority user list 52 until the upper limit of registration is reached.

Alternatively, login frequency (frequency of use of the MFP 1), a group to which the user belongs, rank of the user, and the like may be registered, in addition to the card ID, the user ID, and the successful login attempt record, in the priority user list 52. Items to be deleted may then be automatically selected on the basis of these pieces of registered information.

Alternatively, the upper limit of registration with respect to the priority user list 52 may be arranged to be automatically or manually added, for example, "change 300 users to 310 users".

Alternatively, the priority user list 52 may be stored in a recording medium, such as a semiconductor memory card or a magnetic card, so that the priority user list 52 can be used in a device such as another MFP 1.

At Step S9, the priority user administration module 54 registers in the priority user list 52 the successful login attempt record information that has newly been registered in the successful login attempt record 61*b* as the latest successful login attempt record information. In the example illustrated in FIG. 6, the latest successful login attempt record information is registered in a position above "user015" (at the start of the priority user list 52).

The process thereafter proceeds to Step S16 and the CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

User Authentication Process

When the card ID read from the IC card has been registered in the address book 60*b*, the process shifts to the user authentication process from Step S13 to Step S17. At Step S13, the first authentication module 53 collates the card ID read from the IC card with the priority user list 52. The first authentication module 53 then determines at Step S14 whether the successful login attempt record information that corresponds to the card ID is registered in the priority user list 52.

If the successful login attempt record information that corresponds to the card ID cannot be detected in the priority user list 52, the process proceeds to Step S7. At Step S7, the priority user administration module 54 associates the card ID read from the IC card with the user ID associated with the card ID and the successful login attempt record information that indicates the current time-of-day and date to thereby generate new successful login attempt record information and registers the new successful login attempt record information in the successful login attempt record 61*b*. Additionally, the priority user administration module 54 transfers the generated new successful login attempt record information to the user administration module 63 of the main unit 10. The user administration module 63 of the main unit 10 updates the successful login attempt record 61*a* of the HDD 14 with the transferred new successful login attempt record information.

The priority user administration module 54 determines, at Step S7 and Step S8, whether the number of pieces of successful login attempt record information registered in the priority user list 52 has reached its upper limit. If the upper limit of registration has been reached, the priority user administration module 54 deletes a predetermined number of pieces of successful login attempt record information at Step S10. Then at Step S9, the priority user administration module 54 registers a new piece of successful login attempt record information in the priority user list 52.

The process thereafter proceeds to Step S16 and the CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

If the successful login attempt record information that corresponds to the card ID can be detected in the priority user list 52 (Yes at Step S14), the process proceeds to Step S15. At Step S15, the priority user administration module 54 updates the successful login attempt time and date information of the successful login attempt record information that corresponds to the card ID detected from the priority user list 52 to the current date. This updating causes the successful login attempt record information of the IC card that is currently used by the user to be registered as the latest successful login attempt record information in the priority user list 52. The priority user administration module 54, upon completion of this updating of the priority user list 52, updates the successful login attempt record 61*b* with the latest successful login attempt record information and transfers the latest successful login attempt record information to the user administration module 63 on the main unit 10 side. The user administration module 63 updates the successful login attempt record 61*a* of the HDD 14 with the transferred latest successful login attempt record information.

When the priority user list 52 has been updated, the process proceeds to Step S16. The CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

Effects of First Embodiment

In summary, the MFP 1 in the first embodiment stores in advance the master information of each user, including a user ID, a password, and a card ID, in the address books (60*a*, 60*b*). When a user uses a new card, the MFP 1 requests the user to input his or her user ID and password. The MFP 1 collates the user ID and the password input by the user with the corresponding master information in the address book to thereby perform user authentication. When the user is authenticated to be an authorized user, the MFP 1 generates new master information that includes the card ID of the new card and the user ID and the password input by the user and registers the new master information in the address book.

The foregoing steps enable, when the new card is used, the master information including the card ID of the new card to be registered substantially automatically. This procedure eliminates troublesome steps to be performed by an administrator to manually register the master information of each user. Workload can thereby be reduced in registering and managing the master information of each user for a customer who opts not to have or does not have an administrator.

Each time a login attempt by an authorized user has been successful, the MFP 1 stores in the RAM 23 of the operating unit 20 the successful login attempt record information that associates the card ID with the successful login attempt time and date information that indicates the time-of-day and date when the login attempt was successful as the priority user list 52. At the time of the login attempt, the MFP 1 collates the card ID of the IC card used by the user with the priority user list 52. When the successful login attempt record information that includes the card ID of the IC card used by the user can be detected in the priority user list 52, the MFP 1 authenticates the user of the card ID as an authorized user and enables the user to use the MFP 1.

The foregoing procedures enable the user who succeeded in a login attempt in the past (the user for whom the successful login attempt record information is registered in the priority user list 52) to complete the user authentication procedure and to use the MFP 1 by simply bringing the IC card close to the IC card I/F 29.

Second Embodiment

The following describes an authentication system according to a second embodiment of the present invention. The authentication system according to the second embodiment causes an authentication server device disposed on a network to perform the user authentication process.

Configuration of Authentication System of Second Embodiment

Figure 7:
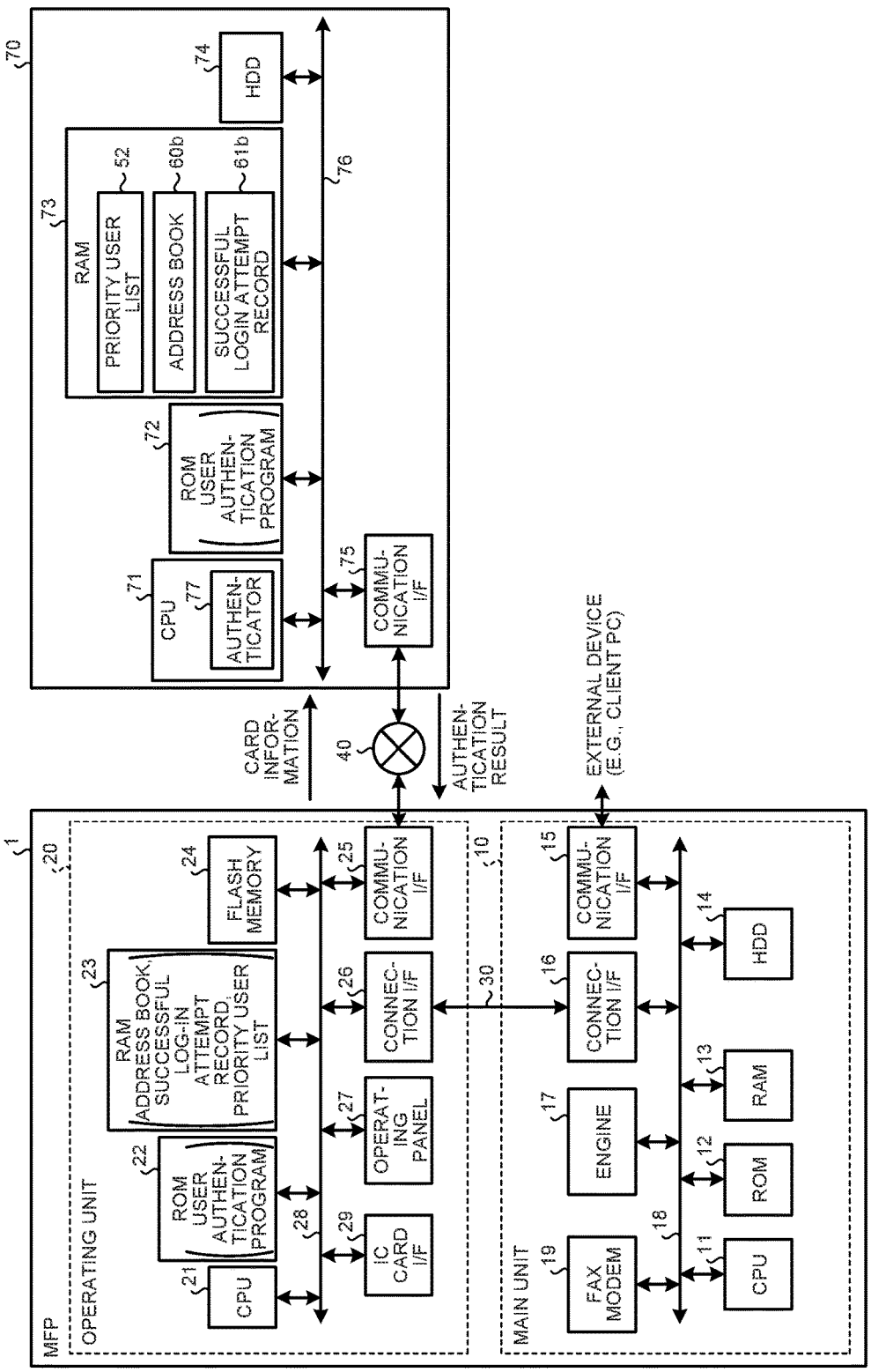
FIG. 7 is a system configuration diagram of an authentication system according to a second embodiment of the present invention.

FIG. 7 illustrates a system configuration of the authentication system according to the second embodiment. In FIG. 7, like elements that exhibit like operations as in the first embodiment described above are identified by like reference numerals. For detailed descriptions of these operations, refer to the descriptions of the first embodiment. Reference is made to FIG. 7. The authentication system according to the second embodiment is configured as follows. Specifically, a communication I/F 25 of an operating unit 20 of a MFP 1 is connected to a network 40 such as the Internet and a communication I/F 75 of an authentication server device 70 is connected to the network 40. The MFP 1 and the authentication server device 70 are thereby connected to each other over the network 40 to thus configure the authentication system in the second embodiment. The MFP 1 is an exemplary device. The authentication server device 70 is an exemplary authentication server device. The communication I/F 25 is an exemplary transmitter. The communication I/F 75 is an exemplary input acquirer and an exemplary authentication result transmitter.

The authentication server device 70 includes a CPU 71, a ROM 72, a RAM 73, a HDD 74, and the communication I/F 75 that are connected to each other via a bus line 76. The ROM 72 stores a user authentication program for executing the user authentication process. The CPU 71 operates in accordance with the user authentication program to function as an authenticator 77 that corresponds to the first authentication module 53 described previously as well as the priority user administration module 54 (see FIG. 3) described previously. The priority user administration module 54 is an exemplary second storage controller and an exemplary first generator. The authenticator 77 is an exemplary authenticator.

The RAM 73 stores an address book 60b and a successful login attempt record 61b that are transmitted in advance from the operating unit 20 of the MFP 1. The CPU 71 stores, as a priority user list 52, the successful login attempt record information for a predetermined number of users extracted from the latest successful login attempt record information out of the successful login attempt record 61b in the RAM 73.

Operation of Authentication System of Second Embodiment

In the authentication system as described above, a CPU 21 of the operating unit 20 of the MFP 1 transmits the address book 60b that stores the master information of each user to the authentication server device 70 in advance. The CPU 71 of the authentication server device 70 stores the transmitted address book 60b in the RAM 73. Additionally, the CPU 21 of the operating unit 20 of the MFP 1 transmits the card ID read by an IC card I/F 29 from the IC card of the user during the login attempt to the authentication server device 70. The authenticator 77 of the authentication server device 70 performs user authentication by collating the card ID transmitted from the MFP 1 with the address book 60b stored in the RAM 73. The CPU 71 generates successful login attempt record information that associates the user ID of the user who has succeeded in the user authentication and the card ID with the latest successful login attempt time and date information and stores the successful login attempt record information as the successful login attempt record 61b in the RAM 73. Furthermore, the authenticator 77 of the authentication server device 70 stores, as the priority user list 52, the successful login attempt record information for a predetermined number of users extracted from the latest successful login attempt record information in the RAM 73. The foregoing steps enable the user authentication process.

Specifically, the operating unit 20 of the MFP 1 transmits the card ID read by the IC card I/F 29 during the login attempt to the authentication server device 70. The authenticator 77 of the authentication server device 70 collates the card ID transmitted from the MFP 1 side with the priority user list 52. If the card ID transmitted from the MFP 1 side exists in any piece of the successful login attempt record information of the priority user list 52, the authenticator 77 authenticates the user of the card ID transmitted from the MFP 1 side as an authorized user. This authentication result is transmitted to the operating unit 20 of the MFP 1 via the network 40. When having received from the authentication server device 70 the authentication result that indicates that the user is an authorized user, the CPU 21 of the operating unit 20 communicates with a CPU 11 of a main unit 10 to thereby enable the use of the MFP 1.

Effects of Second Embodiment

In the authentication system according to the second embodiment, the user authentication process is performed on the side of the authentication server device 70, so that load on the MFP 1 side can be reduced and similar effects as in the first embodiment can be achieved.

Third Embodiment

The following describes an authentication system according to a third embodiment of the present invention. The authentication system according to the third embodiment includes a plurality of authentication server devices disposed on a network and causes the authentication server devices to share the user authentication process.

Configuration of Authentication System of Second Embodiment

Figure 8:
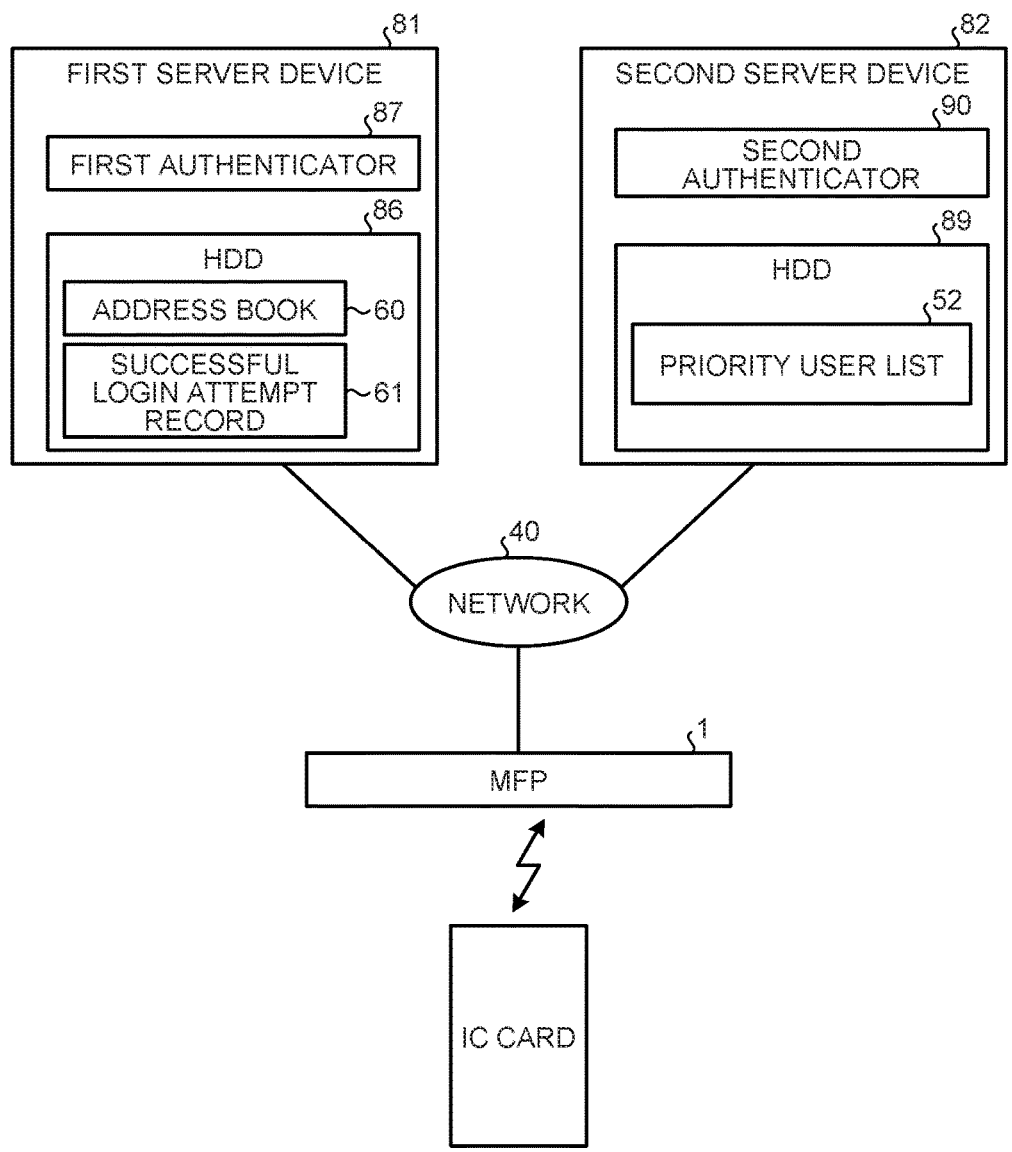
FIG. 8 is a system configuration diagram of an authentication system according to a third embodiment of the present invention.

FIG. 8 illustrates a system configuration of the authentication system according to the third embodiment. In FIG. 8, like elements that exhibit like operations as in the first embodiment described above are identified by like reference numerals. For detailed descriptions of these operations, refer to the descriptions of the first embodiment. Reference is made to FIG. 8. The authentication system according to the third embodiment includes a first server device 81 that performs a registration process for a new IC card, a second server device 82 that performs user authentication, and a MFP 1. The first server device 81, the second server device 82, and the MFP 1 are connected to each other over a network 40.

The MFP 1 is an exemplary device. The first server device 81 that performs a registration process for a new IC card is an exemplary first server device. The second server device 82 that performs user authentication is an exemplary second server device. The MFP 1 has a configuration described with reference to FIG. 1. The MFP 1 includes a CPU 11 as an exemplary provision controller and an engine 17 as an exemplary function provider. In addition, as described with reference to FIG. 3, the MFP 1 includes a priority user administration module 54 as an exemplary first storage controller and an IC card control module 55 as an exemplary input acquirer. Additionally, as described with reference to FIG. 1, the MFP 1 includes a communication I/F 25 as an exemplary first transmitter and a RAM 23 as an exemplary first storage.

The first server device 81 performs the new IC card registration process that corresponds to the steps from Step S4 through Step S12 of the flowchart illustrated in FIG. 4. The first server device 81 includes a first authenticator 87 serving as a function achieved by a CPU executing the user authentication program. The first authenticator 87 is an exemplary acquirer, second storage controller, first generator, and second transmitter. The first authenticator 87 stores an address book 60 transmitted from the MFP 1 in a HDD 86. The first authenticator 87 also stores in a successful login attempt record 61 of the HDD 86 successful login attempt record information generated through collating of a card ID of an IC card transmitted from the MFP 1 during a login attempt with the address book 60.

The second server device 82 is the server that performs the user authentication process that corresponds to the steps from Step S13 through Step S17 in the flowchart of FIG. 4. The second server device 82 includes a second authenticator 90 serving as a function achieved by the CPU executing the user authentication program. The second authenticator 90 is an exemplary third storage controller, authenticator, and authentication result transmitter. The second server device 82 stores, in a priority user list 52 serving as an exemplary third storage of a HDD 89, successful login attempt record information for a predetermined number of users extracted from the latest successful login attempt record information transmitted from the first server device 81.

Operation of Authentication System in Third Embodiment

In the authentication system, a CPU 21 of an operating unit 20 of the MFP 1 transmits in advance the address book 60 that stores the master information of each user to the first server device 81. The first authenticator 87 of the first server device 81 stores the transmitted address book 60 in the HDD 86. Additionally, the CPU 21 of the operating unit 20 of the MFP 1 transmits the card ID read by an IC card I/F 29 from the IC card of the user during the login attempt to the first server device 81 and the second server device 82.

The first authenticator 87 of the first server device 81 performs user authentication by collating the card ID transmitted from the MFP 1 with the address book 60 stored in the HDD 86. The first authenticator 87 generates successful login attempt record information that associates the user ID of the user who has succeeded in the user authentication and the card ID with the successful login attempt time and date information and stores the successful login attempt record information in the successful login attempt record 61. Furthermore, the first authenticator 87 of the first server device 81 reads from the HDD 86 the successful login attempt record information for a predetermined number of users extracted from the successful login attempt record information of the latest successful login attempt time and date and transmits the successful login attempt record information for the predetermined number of users to the second server device 82 over the network 40.

If the card ID transmitted from the MFP 1 is yet to be registered in the address book 60, the first authenticator 87 of the first server device 81 requests the MFP 1 to input the user ID, the password, and other user information. The first authenticator 87 performs user authentication by collating the user information transmitted from the MFP 1 in response to the foregoing input request with the user information of the address book 60. The first authenticator 87, when having detected a plurality of times of inputs of wrong user information as a result of the user authentication, transmits an authentication result of an unauthorized user to the MFP 1.

In contrast, if the card ID transmitted from the MFP 1 has been registered in the address book 60, this signifies that an IC card having a new card ID that has not been registered in the address book 60 is being used. Thus, the first authenticator 87 registers the new card ID, user ID, and password in the address book 60. Additionally, the first authenticator 87 notifies the MFP 1 of the card IC, the user ID, and the password that have newly been registered in the address book 60. The MFP 1 updates an address book (60a) stored in a HDD 14 with the notified new card ID, user ID, and password.

Moreover, the first authenticator 87 generates the latest successful login attempt record information that associates the new card ID and user ID with the successful login attempt time and date information and registers the successful login attempt record information in the successful login attempt record 61. The first authenticator 87 reads from the HDD 86 the successful login attempt record information for a predetermined number of users extracted from the successful login attempt record information of the latest successful login attempt time and date and transmits the successful login attempt record information for the predetermined number of users to the second server device 82 over the network 40.

The second server device 82 stores the successful login attempt record information for the predetermined number of users transmitted from the first server device 81 in the priority user list 52 of the HDD 89. The second authenticator 90 of the second server device 82 collates the card ID transmitted from the MFP 1 with the priority user list 52. If the card ID transmitted from the MFP 1 side exists in any piece of the successful login attempt record information of the priority user list 52, the second authenticator 90 authenticates the user of the card ID transmitted from the MFP 1 side as an authorized user. This authentication result is transmitted to the operating unit 20 of the MFP 1 via the network 40. When having received from the second server device 82 the authentication result that indicates that the user is an authorized user, the CPU 21 of the operating unit 20 communicates with the CPU 11 of a main unit 10 to thereby enable the use of the MFP 1.

Effects of Third Embodiment

In the authentication system according to the third embodiment, the user authentication process is shared between the first server device 81 and the second server device 82, so that load required for the user authentication process on the MFP 1, the first server device 81, and the second server device 82 can be considerably reduced and similar effects as in the first embodiment can be achieved.

Fourth Embodiment

The following describes an authentication system according to a fourth embodiment. In the authentication systems according to the first through third embodiments described above, the priority user list 52 is stored in the RAM 23 of the operating unit 20; upon a login attempt, the card ID of the IC card used by the user is collated with the priority user list 52 and when the user is authenticated as an authorized user, the use of the MFP 1 is enabled. The authentication system in the fourth embodiment to be described hereunder exemplifies an arrangement in which the user authentication is enabled by creating a priority user list dedicated to an application program developed by a vendor (hereinafter referred to as a vendor application) when the vendor application is installed in the operating unit 20 (or the main unit 10).

Figure 9:
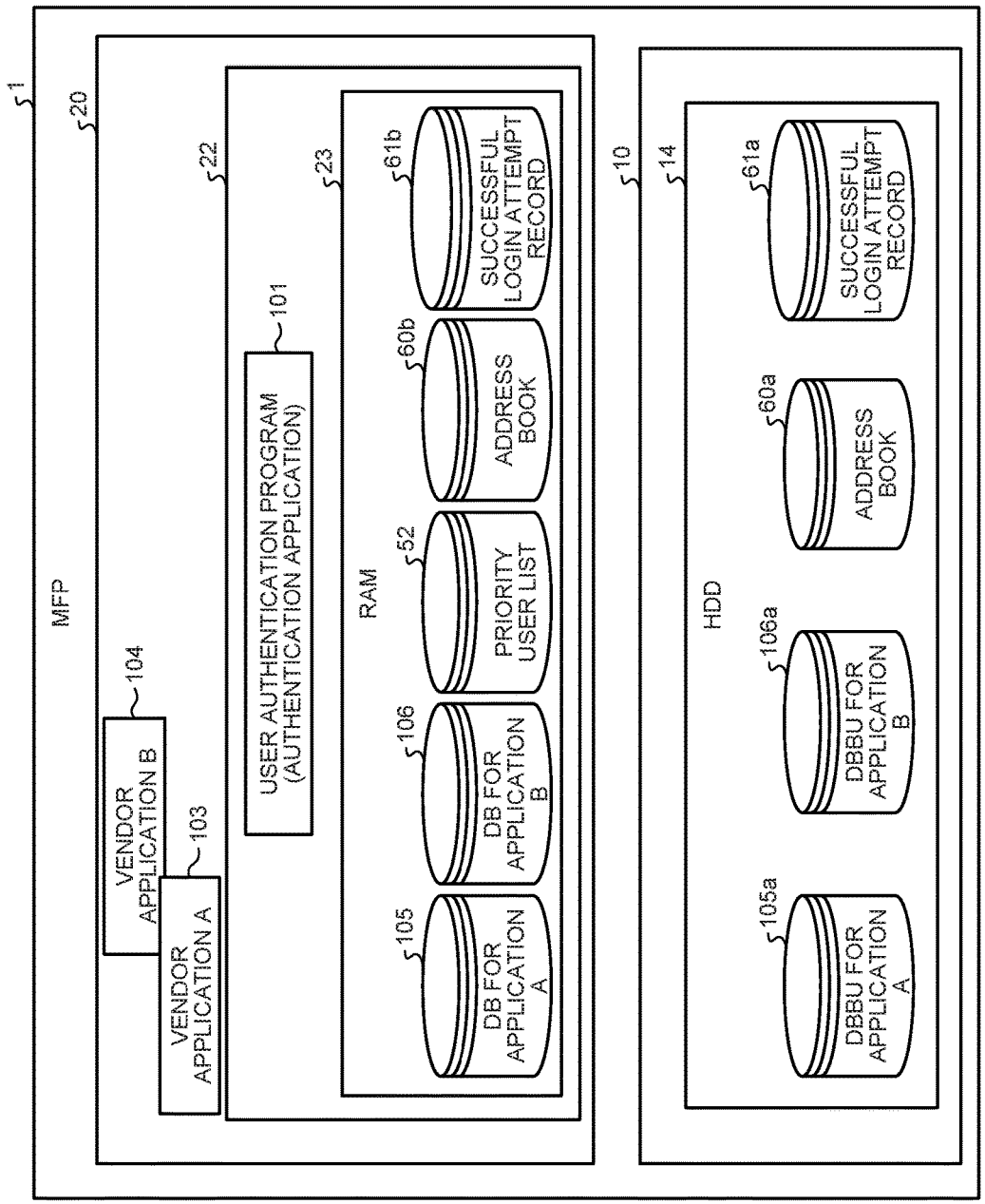
FIG. 9 is a schematic diagram of a configuration of main components of an authentication system according to a fourth embodiment of the present invention.

FIG. 9 is a schematic diagram illustrating a configuration of main components of the authentication system in the fourth embodiment. Reference is made to FIG. 9. With the authentication system in the fourth embodiment, a user authentication program (hereinafter referred to as an authentication application) 101 that enables authentication processing for the vendor application is stored in the ROM 22 of the operating unit 20. When, for example, a vendor application A 103 and a vendor application B 104 are installed, the CPU 21 of the operating unit 20 operates in accordance with the authentication application 101 to thereby create a priority user list dedicated to each of the vendor applications.

A database for use in application A (DB for use in application A) 105 illustrated in FIG. 9 represents a priority user list for use in the vendor application 103. Similarly, a database for use in application B (DB for use in application B) 106 illustrated in FIG. 9 represents a priority user list for use in the vendor application 104. It is noted that a DB BU 105*a* for use in application A stored in the HDD 14 of the main unit 10 illustrated in FIG. 9 represents backup data of the DB 105 for use in application A. Similarly, a DB BU 106*a* for use in application B represents backup data of the DB 106 for use in application B.

As is known from FIG. 9, the DB 105 for use in application A and the DB 106 for use in application B are created separately from a "standard priority database (standard priority DB), such as the priority user list 52 and the successful login attempt record 61*b* described previously. Although this will be detailed later, the standard priority DB is disabled and is not used for user authentication while the vendor application DB is used. Specifically, the authentication system in the fourth embodiment does not perform user authentication using the standard priority DB while the vendor application user authentication is valid.

Additionally, while FIG. 9 illustrates two (a plurality of) vendor applications 103 and 104 installed in the MFP 1, the authentication system in the fourth embodiment treats as a valid vendor application only one vendor application that has completed user registration to be described later. Specifically, the authentication system in the fourth embodiment treats only one vendor application and the DB dedicated to the vendor application as being valid. Another possible arrangement is such that, when a first vendor application is installed and a DB dedicated to the installed first vendor application is created, installation of a second vendor application is rejected, or the installation of the second vendor application is enabled only after the first vendor application installed previously and the DB dedicated to the first vendor application are erased.

Figure 10:
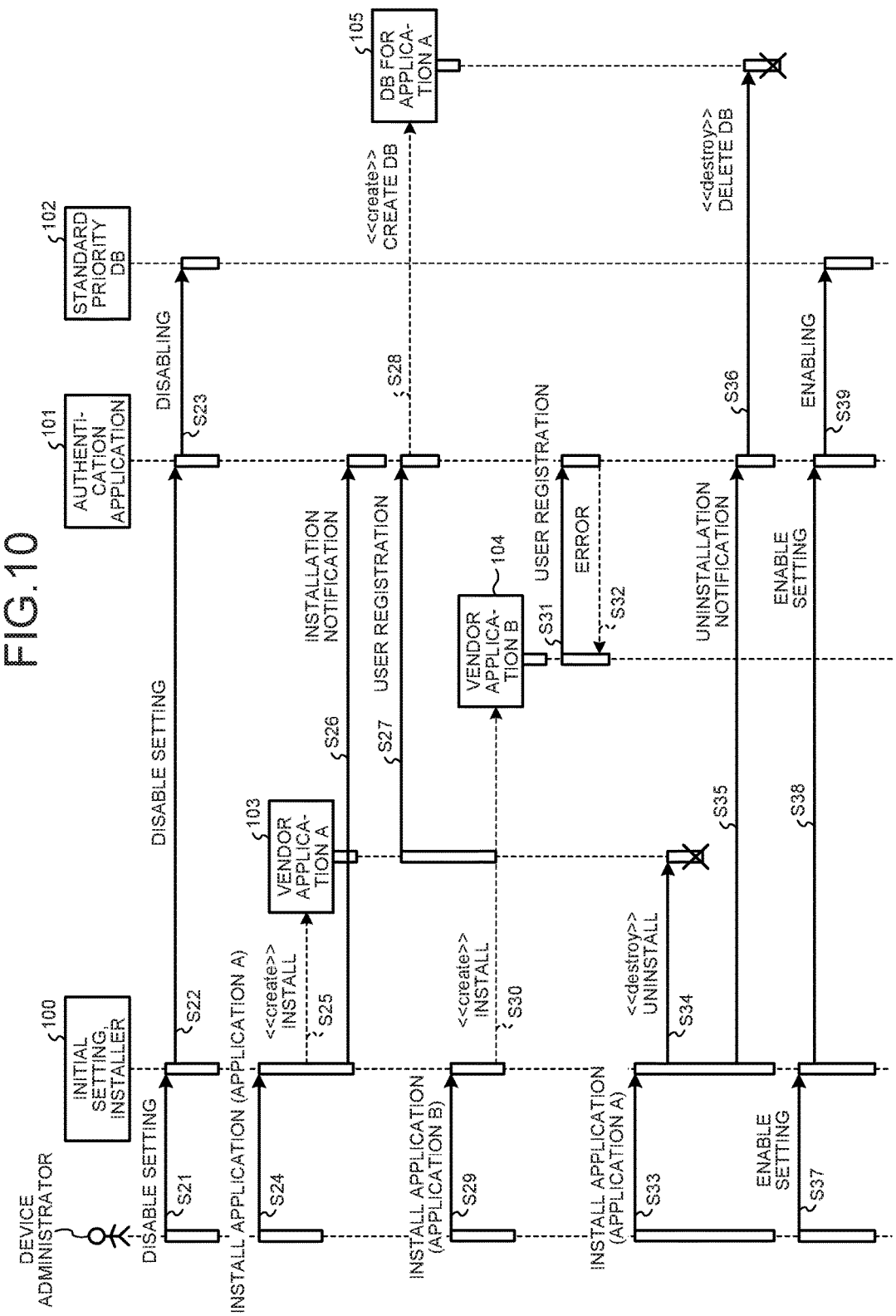
FIG. 10 is a sequence diagram illustrating steps to be performed for installing vendor applications in the authentication system according to the fourth embodiment.

A sequence diagram of FIG. 10 illustrates steps to be performed for installing vendor applications in the authentication system in the fourth embodiment. When a user such as a device administrator instructs to install a vendor application at Step S21, an installer 100 of the operating unit 20 issues, at Step S22, to the authentication application 101 an installation notification that notifies that installation of a vendor application has been specified. The authentication application 101, upon receipt of the installation notification, disables a standard priority DB 102, such as the priority user list 52, the successful login attempt record 61*b*, and the address book 60*b* (step S23).

When the device administrator instructs at Step S24 to start the installation of the vendor application, the installer 100 installs the vendor application 103 in the RAM 23 at Step S25 as illustrated in FIGS. 9 and 10. Upon completion of the installation of the vendor application 103, the installer 100 issues, at Step S26, to the authentication application 101 an installation notification that indicates that the installation of the vendor application has been completed. Additionally, the installed vendor application 103 performs user registration with respect to the authentication application 101 at Step S27. When this user registration is completed, the authentication application 101 creates at Step S28 the DB 105 dedicated to the vendor application 103 illustrated in FIGS. 9 and 10.

Figure 11:
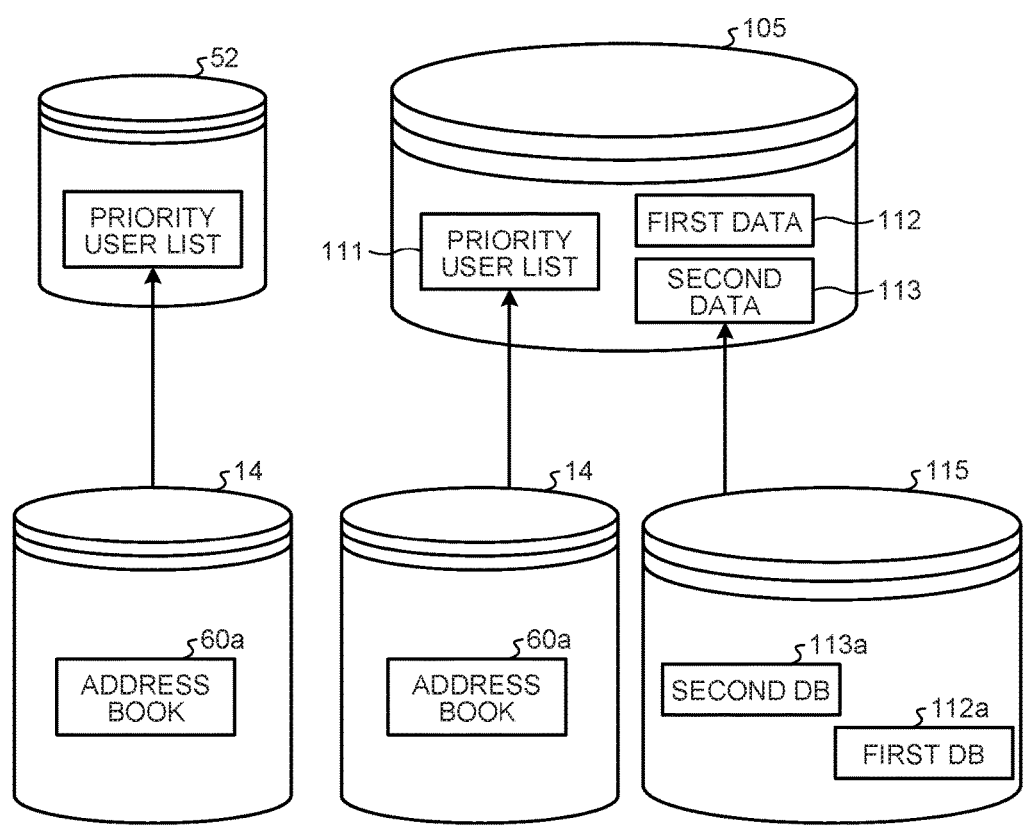
FIG. 11 is a diagram for illustrating an operation to create a database dedicated to the vendor application in the authentication system according to the fourth embodiment.

It is here noted that the standard priority DB 102 handles a data structure of the address book 60*b* of the main unit 10. In contrast, each vendor application has a unique data structure different from each other. As a result, the DB created as being dedicated to the vendor application 103 is created as follows. Specifically, as illustrated in FIG. 11, in addition to the information of the address book 60*a*, the DB 105 dedicated to the vendor application 103 is created through reading of data from, for example, a first DB 112*a* and a second DB 113*a* that serve as databases uniquely assigned to the vendor application 103 and that are stored in a storage medium 115 uniquely assigned to the vendor application 103. This reading of data creates the DB 105 dedicated to the vendor application 103. Specifically, the DB 105 includes a priority user list 111, data (first data 112) of the first DB 112*a*, and data (second data 113) of the second DB 113*a* as illustrated in FIG. 11.

Figure 12:
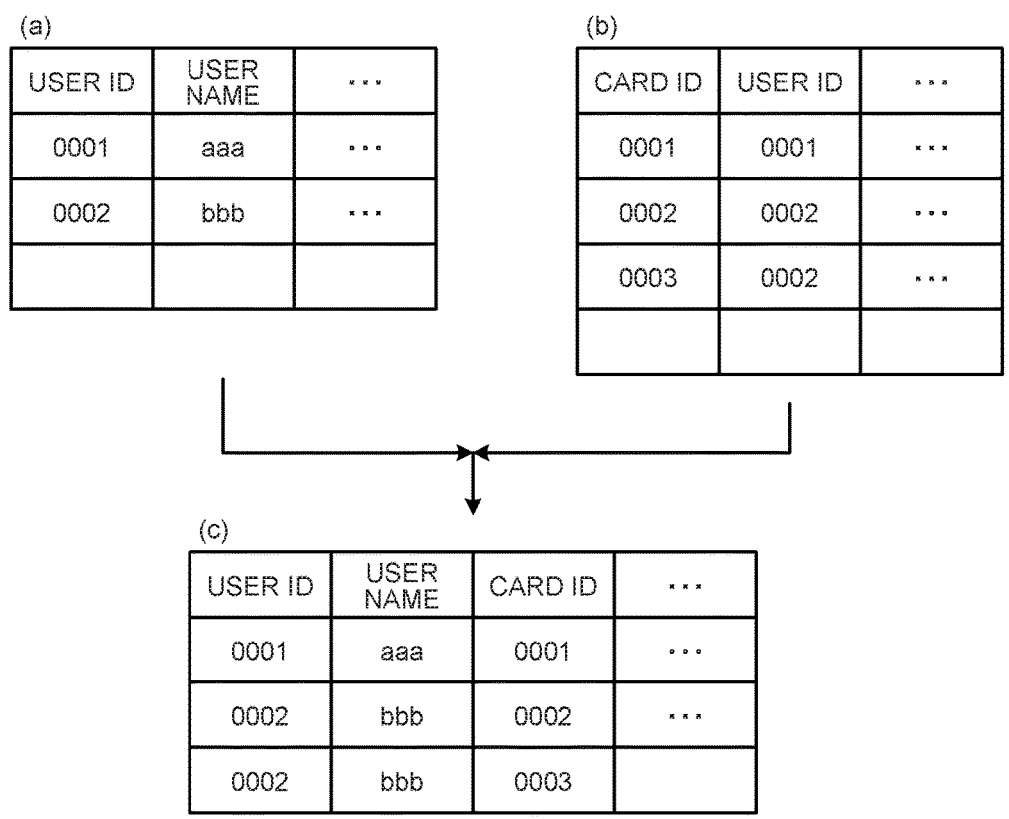
FIG. 12 is a diagram for illustrating a specific example of the operation to create the database dedicated to the vendor application in the authentication system according to the fourth embodiment.

FIG. 12 illustrates an exemplary arrangement having a card information table in addition to a user table in order to allow the user to handle a plurality of IC cards. A card information table as a table uniquely assigned to the vendor application 103 illustrated in a section (b) of FIG. 12 is combined with a basic address book table illustrated in a section (a) of FIG. 12 to create the DB 105 dedicated to the vendor application 103 as illustrated in a section (c) FIG. 12C. This arrangement enables the vendor application 103 to use a view that combines the two tables. A single user can thus register and use a plurality of card IDs.

When the device administrator instructs to install another vendor application, specifically, the vendor application 104 at Step S29, following the creation of the DB 105 dedicated to the vendor application 103, the installer 100 installs the vendor application 104 in the RAM 23 at Step S30. When the vendor application 104 attempts to perform user registration with respect to the authentication application 101 at Step S31, the authentication application 101 processes the user registration by the vendor application 104 as an error at Step S32 because of the previous registration by the vendor application 103. This arrangement enables only one vendor application for operation without allowing a plurality of vendor applications to conflict with each other.

When the device administrator instructs to uninstall the vendor application 103 at Step S33, the installer 100 uninstalls, at Step S34, the vendor application 103 that has been installed in the RAM 23. Upon completion of uninstalling the vendor application 103, the installer 100 issues, at Step S35, to the authentication application 101 an uninstallation notification that notifies that the vendor application 103 has been uninstalled. Upon receipt of the uninstallation notification, the authentication application 101 deletes the DB 105 dedicated to the vendor application 103 from the RAM 23 at Step S36.

When the vendor application and the DB dedicated to the vendor application that are installed in the RAM 23 have been deleted, the device administrator instructs on a setup screen to make an enable setting for the standard priority DB 102. This specification for making the enable setting is notified from the installer 100 to the authentication application 101 as illustrated at Step S37 and Step S38. This notification causes the authentication application 101 to return a disable setting made for the standard priority DB 102 at the installation of the vendor application to the enable setting as illustrated at Step S39. It is noted that the installation of a vendor application deletes a DB dedicated to the vendor application; however, the standard priority DB 102 is not deleted regardless of whether the vendor application is installed or uninstalled. The standard priority DB 102 is controlled to be set to be enabled or disabled.

Figure 13:
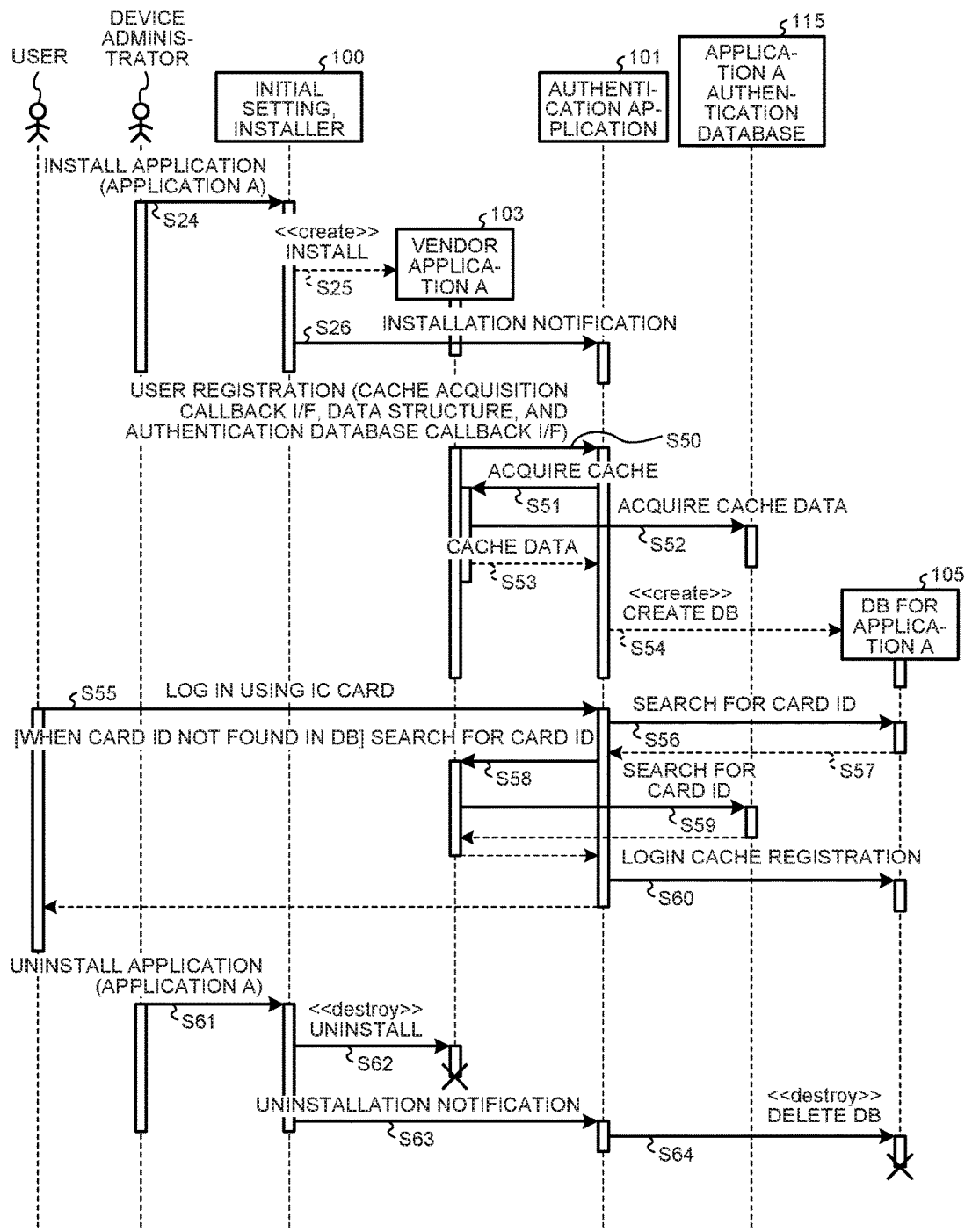
FIG. 13 is a sequence diagram illustrating an operation through which the DB dedicated to the vendor application in the authentication system according to the fourth embodiment is used for user authentication.

A sequence diagram of FIG. 13 illustrates an operation through which the DB dedicated to the vendor application is used for user authentication. Steps from Step S24 to Step S26 of FIG. 13 represent a procedure for installing the vendor application 103 in the RAM 23. For details, see the description given previously.

At Step S50, the installed vendor application 103 specifies a cache acquisition callback I/F, a data structure, and an authentication database callback I/F and performs user registration with respect to the authentication application 101. At Step S51, the authentication application 101 refers to the cache acquisition callback I/F specified at the user registration to thereby request the vendor application 103 to acquire a cache. As described previously with reference to FIGS. 11 and 12A to 12C, the vendor application 103 acquires data uniquely assigned to the vendor application 103 from the storage medium 115 uniquely assigned to the vendor application 103 (step S52). As illustrated at Step S53 and Step S54, the vendor application 103 uses the acquired data and the priority user list 111 to create the DB 105 dedicated to the vendor application 103.

When the user holds up the IC card to make a login request as illustrated at Step S55, the authentication application 101 searches the DB 105 dedicated to the vendor application 103 to acquire the card ID of the IC card held up by the user at Step S56 and Step S57. If the card ID of the IC card held up by the user is found in the DB 105 dedicated to the vendor application 103, the user is authenticated as an authorized user and a function of the vendor application 103 is provided.

If the card ID of the IC card held up by the user is not found in the DB 105 dedicated to the vendor application 103, the authentication application 101 notifies the vendor application 103 at Step S58 that the card ID has not been found. Upon receipt of the notification that the card ID has not been found, the vendor application 103 requests the DB 105 dedicated to the vendor application 103 to search for the card ID again at Step S59. Upon receipt of a notification that the card ID has not been found from the DB 105 dedicated to the vendor application 103, a request is made to the authentication application 101 to register the card ID that has not been found in the DB 105. At Step S60, the authentication application 101 registers the card ID newly in the DB 105 dedicated to the vendor application 103. The registration of the new card ID is notified to the user.

It is noted that an operation to uninstall the vendor application 103 and to delete the DB 105 at steps from Step S61 to Step S63 of FIG. 13 is identical to the operation to uninstall the vendor application 103 and to delete the DB 105 described with reference to the steps from Step S33 to Step S36 of FIG. 10. For details, see the description given for the steps from Step S33 to Step S36 of FIG. 10.

As described above, the authentication system according to the fourth embodiment can achieve effects identical to the effects achieved by each of the first through third embodiments, in addition to providing a vendor application developed by a vendor with an authentication function equivalent to the authentication function described in the first through third embodiments.

Fifth Embodiment

The following describes an authentication system according to a fifth embodiment. In the authentication system according to each of the first to fourth embodiments described above, the operating unit 20 creates the priority user list 52 on the basis of the address book 60a stored in the HDD 14 of the main unit 10. With the authentication system according to the fourth embodiment described above, the successful login attempt records 61a and 61b described above are not to be used when the DB dedicated to the vendor application is created. In this context, the authentication system in the fifth embodiment represents an example in which, the DB dedicated to the vendor application is to be created on the basis of data dedicated to the vendor application acquired from an authentication server device on a network. The authentication system in the fifth embodiment also represents an example in which a successful login attempt record stored in the authentication server device is used.

Specifically, in the fifth embodiment, the data stored in the authentication server device is acquired to create the DB dedicated to the vendor application. This configuration enables a plurality of MFPs 1 to refer to a single DB (authentication server device) and to share the authentication information. In addition, the fifth embodiment specifies the authentication server device as a storage in which the successful login attempt record is stored. This arrangement enables the successful login attempt record to be automatically registered in the authentication server device. Additionally, on the vendor application side, the arrangement allows the MFPs 1 to share the login information without the need to consider possible contention.

Figure 14:
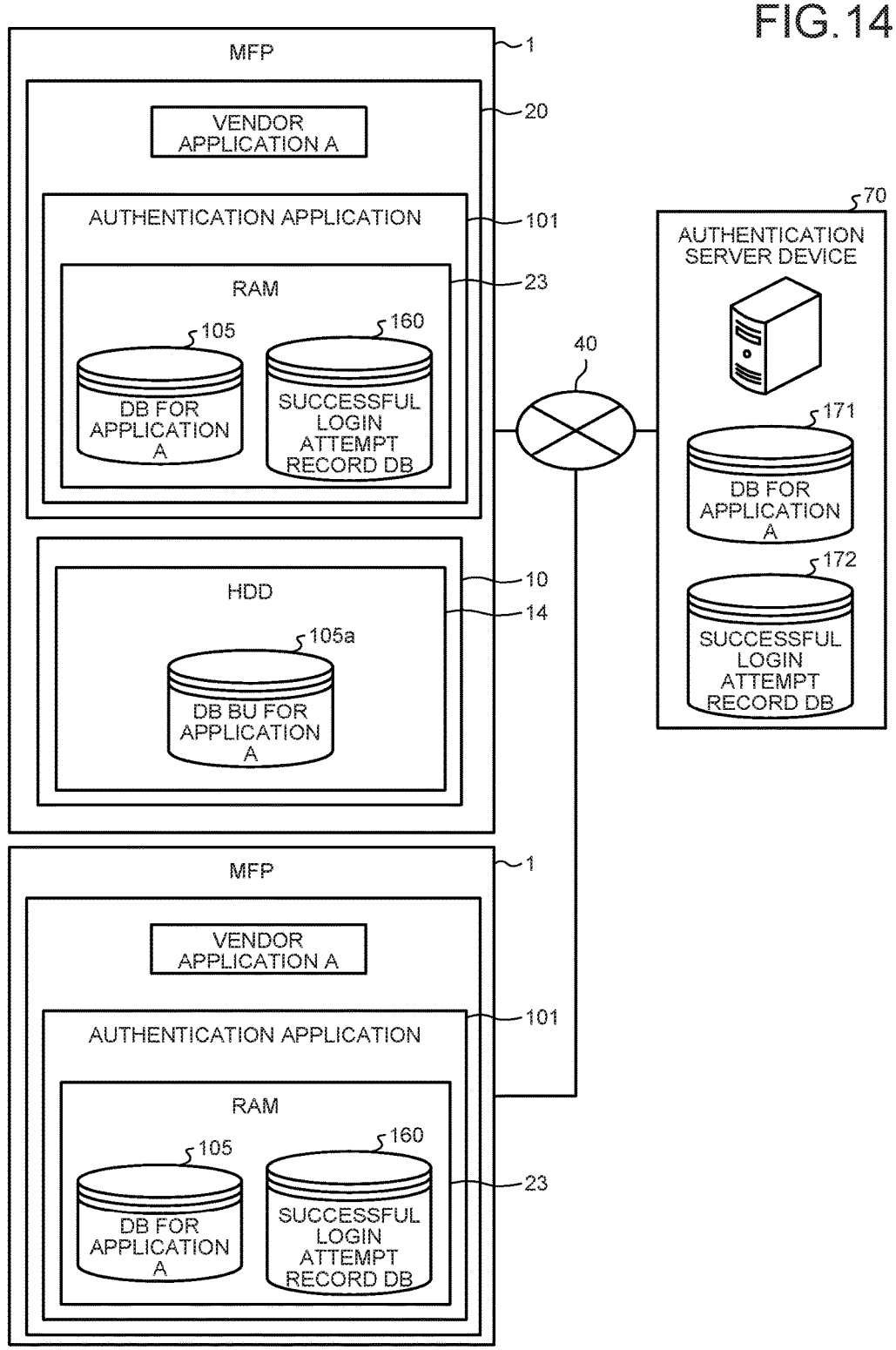
FIG. 14 is a system configuration diagram of an authentication system according to a fifth embodiment of the present invention.

FIG. 14 is a schematic system configuration diagram of main elements of the authentication system according to the fifth embodiment. As illustrated in FIG. 14, the authentication system in the fifth embodiment includes an authentication server device 70 that is connected to a plurality of MFPs 1 over a network 40.

The authentication server device 70 includes a DB 171 and a successful login attempt record DB 172. The DB 171 stores data dedicated to the vendor application. The DB 171 is specified as a source for acquiring the data dedicated to the vendor application. The vendor application 103 acquires the data dedicated to the vendor application 103 from the DB 171 to thereby create the DB 105 dedicated to the vendor application described previously.

Each time a login attempt has been successful, the MFP 1 transmits the successful login attempt record to the authentication server device 70. The authentication server device 70 stores the successful login attempt record transmitted from the MFP 1 in the successful login attempt record DB 172. To create the DB 105 dedicated to the vendor application, the vendor application 103 acquires the successful login attempt record from the successful login attempt record DB 172 of the authentication server device 70. In FIG. 14, the DB 105 and a DB 160 denote DBs created by the vendor application 103.

Figure 15:
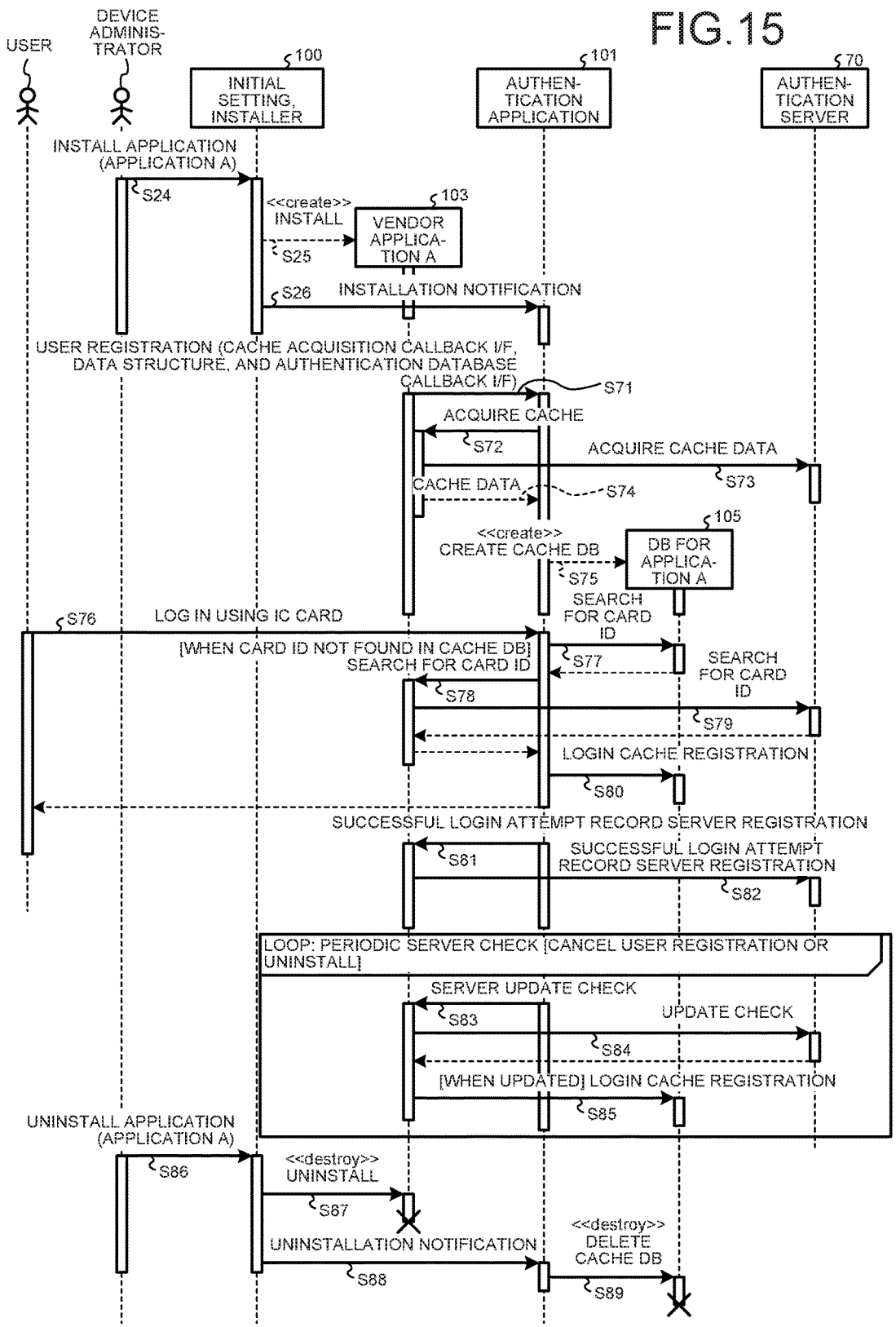
FIG. 15 is a sequence diagram illustrating steps to be performed for sharing a user authentication database (login cache) in the authentication system according to the fifth embodiment.

FIG. 15 illustrates steps to be performed for sharing the successful login attempt record DB 172 among the MFPs 1. Steps from Step S24 to Step S26 of FIG. 15 represent a procedure for installing the vendor application 103 in the RAM 23. For details, see the description given previously.

At Step S71, an installer 100 specifies a cache acquisition callback I/F, a data structure, and an authentication database callback I/F and performs user registration with respect to an authentication application 101. At Step S72, the authentication application 101 refers to the cache acquisition callback I/F specified at the user registration to thereby request the vendor application 103 to acquire a cache. At Step S73, the vendor application 103 acquires data uniquely assigned to the vendor application 103 from the DB 171 and the successful login attempt record DB 172 of the authentication server device 70 illustrated in FIG. 14. As illustrated at Step S74 and Step S75, the vendor application 103 uses the acquired data to create the DB 105 dedicated to the vendor application 103.

When the user holds up the IC card to make a login request as illustrated at Step S76, the authentication application 101 searches the DB 105 dedicated to the vendor application 103 to acquire the card ID of the IC card held up by the user at Step S77. If the card ID of the IC card held up by the user is found in the DB 105 dedicated to the vendor application 103, the user is authenticated as an authorized user and a function of the vendor application 103 is provided.

If the card ID of the IC card held up by the user is not found in the DB 105 dedicated to the vendor application 103, the authentication application 101 notifies the vendor application 103 at Step S78 that the card ID has not been found. Upon receipt of the notification that the card ID has not been found, the vendor application 103 requests the authentication server device 70 to search for the card ID at Step S79. The authentication server device 70 refers to the DB 171 and the DB 172 to search for the card ID.

If a notification that the card ID has not been found is received from the authentication server device 70, the authentication application 101 recognizes that the user has used a new IC card. Then, at Step S80, the authentication application 101 performs a login registration process corresponding to the new IC card with respect to the successful login attempt record information DB 160 of the DB 105 dedicated to the vendor application 103. In addition, the authentication application 101 performs, at Step S81 and Step S82, the login registration process corresponding to the new IC card with respect to the successful login attempt record DB 172 of the authentication server device 70.

For cancellation of user registration, the authentication application 101 performs update confirmation with respect to the authentication server device 70 at regular intervals. Specifically, as illustrated at Step S83, the authentication application 101 requests the vendor application 103 to confirm updating of the authentication server device 70. At Step S84, the vendor application 103 requests the authentication server device 70 to confirm updating. The authentication server device 70 returns a response of whether each of the DB 171 and the DB 172 is updated to the vendor application 103. If the DB 171 and the DB 172 of the authentication server device 70 have been updated, the vendor application 103 incorporates the update of each of the DB 171 and the DB 172 of the authentication server device 70 in the DB 105 dedicated to the vendor application 103 created in the RAM 23. The foregoing steps allow each of the DB 171 and the DB 172 of the authentication server device 70 to be operatively associated with the DB 105 dedicated to the vendor application 103.

It is noted that an operation to uninstall the vendor application 103 and to delete the DB 105 at steps from Step S86 to Step S89 of FIG. 15 is identical to the operation to uninstall the vendor application 103 and to delete the DB 105 described with reference to the steps from Step S33 to Step S36 of FIG. 10. For details, see the description given for the steps from Step S33 to Step S36 of FIG. 10.

In summary, the authentication system in the fifth embodiment creates the DB 105 dedicated to the vendor application 103 on the basis of the data dedicated to the vendor application acquired from the authentication server device 70 that is connected to the network 40. The authentication system in the fifth embodiment creates the DB 160 using the successful login attempt record of each MFP 1 stored in the successful login attempt record DB 172 in the authentication server device 70. This arrangement enables a plurality of MFPs 1 to refer to the same DB (authentication server device 70) and to share the authentication information. Additionally, by specifying the authentication server device 70 as a storage in which the successful login attempt record is stored, the successful login attempt record of each MFP 1 can be automatically and centrally registered in the authentication server device 70. As a result, on the vendor application side, the MFPs 1 can share the login information without the need to consider possible contention. In addition to the above, the authentication system in the fifth embodiment can achieve the same effects as the effects achieved by each of the above-described embodiments.

The above-described embodiments are provided as examples, and are not intended to limit the scope of the present invention. Each of these novel embodiments can be implemented in any of other various forms, and various omissions, substitutions, and alterations can be made thereto without departing from the spirit of the invention.

For example, the embodiments have been described for the present invention applied to the MFP 1 in which the operating unit 20 is removable with respect to the main unit 10. Nonetheless, the same effects as noted above can still be achieved in a device including a MFP in which an operating unit is fixed to a main unit of the MFP.

Additionally, the MFP 1 in the embodiments is an exemplary device to which the present invention is applied. The present invention may therefore be applied to any device that performs user authentication other than the MFP 1, including a projector device, a TV conference system, and a digital camera device.

The accompanying claims and their equivalents are intended to cover such embodiments or modifications as would fall within the scope and spirit of the invention.

Embodiments provide an effect that complications involved in registering user authentication information are eliminated and efficient user authentication is enabled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device configured to perform plural predetermined functions, the device comprising:
   a main body including a first processor configured to execute one or more first programs of instructions to:
   provide a predetermined function to be performed, amongst the plural predetermined functions;
   generate authentication information to be used for user authentication, and register, in a first storage device, the generated authentication information to be used for user authentication; and
   provide the predetermined function amongst the plural predetermined functions when a user authentication result indicating that a specified user is an authorized user is obtained; and
   an operating body including a second processor configured to execute one or more second programs of instructions to:
   acquire, from the first storage device before performance of a user authentication process, the authentication information registered in the first storage device;
   register, in a second storage device, the acquired authentication information;
   generate first priority user information and register the first priority user information in the second storage device, the first priority user information including, amongst the acquired authentication information, specified authentication information corresponding to a specified user amongst recently-authenticated users each having been recently authenticated as an authorized user, the specified authentication information for each user in the first priority user information including corresponding user authentication time information;
   install, in the second storage device, a program that becomes usable by the user upon authentication of the user as an authorized user;
   generate second priority user information separately from the first priority user information and register the second priority user information in the second storage device, the second priority user information specifying recently-authenticated users each having been recently authenticated as an authorized user of the installed program;
   acquire input information that is input in the user authentication process; and
   perform the user authentication process, including collating the input information with the first priority user information or the second priority user information registered in the second storage device, to obtain a user authentication result of the user authentication process, and when the input information is collated with the first priority user information, notifying the main body of the user authentication result, and when the input information is collated with the second priority user information and the user authentication result indicates that the specified user is an authorized user, providing the program installed in the second storage device, to be used by the authorized user,
   wherein the operating body is further configured to disable, while the program is installed, the first priority user information and enable the second priority user information.

2. The device according to claim 1, wherein the operating body is further configured to:
   perform, by a registrant, user registration for a desired program out of a plurality of installed programs; and
   generate the second priority user information to be used for the program for which the user registration is performed.

3. The device according to claim 1, wherein
   the operating body is further configured to combine the first priority user information with information for the installed program to generate the second priority user information.

4. The device according to claim 1, wherein
   the operating body is further configured to generate the second priority user information, including a successful login attempt record that indicates authentication time-of-day at which an authorized user is authenticated in the user authentication.

5. The device according to claim 1, wherein
   the operating body is further configured to acquire, via a network, from a server device in which information that serves as a source for generating the second priority user information is registered, the information that serves as said source, to generate the second priority user information.

6. An authentication processing method that acquires, by an operating body, authentication information before performance of user authentication, that collates input information that is input in the operating body with the authentication information to be used for user authentication, and that provides a predetermined function amongst plural predetermined functions of a main body to be performed when an authorized user is authenticated, the method comprising:
   performing, by main body:
   providing the predetermined function to be performed amongst the plural predetermined functions;
   generating the authentication information to be used for user authentication, and registering, in a first storage device, the generated authentication information to be used for user authentication in a first storage device; and
   providing the predetermined function amongst the plural predetermined functions when a user authentication result indicating that a specified user is an authorized user is obtained; and
   performing, by the operating body:
   acquiring, before performance of a user authentication process, the authentication information registered in the first storage device;
   registering the acquired authentication information in a second storage device:
   generating first priority user information and registering the first priority user information in the second storage device, the first priority user information including, amongst the acquired authentication information, specified authentication information corresponding to a specified user amongst recently-authenticated users each having been recently authenticated as an authorized user, the specified authentication information for each user in the first priority user information including corresponding user authentication time information;

installing, in the second storage device, a program that becomes usable by the user upon authentication of the user as an authorized user;

generating second priority user information separately from the first priority user information and registering the second priority user information in the second storage device, the second priority user information specifying recently-authenticated users each having been recently authenticated as an authorized user of the installed program;

acquiring input information that is input in the user authentication process; and performing the user authentication process, including collating the input information with the first priority user information or the second priority user information registered in the second storage device, to obtain a user authentication result of the user authentication process, and when the input information is collated with the first priority user information, notifying the main body of the user authentication result, and when the input information is collated with the second priority user information and the user authentication result indicates that the specified user is an authorized user, providing the program installed in the second storage device, to be used by the authorized user, wherein the method further comprises disabling, by the operating body, while the program is installed, the first priority user information and enabling the second priority user information.

7. The authentication processing method according to claim 6, further comprising:

performing, by a registrant, user registration for a desired program out of a plurality of installed programs; and generating the second priority user information to be used for the program for which the user registration is performed.

8. The authentication processing method according to claim 6, further comprising combining, by the operating body, the first priority user information with information for the installed program and generating the second priority user information.

9. The authentication processing method according to claim 6, further comprising generating, by the operating body, the second priority user information, including a successful login attempt record that indicates authentication time-of-day at which an authorized user is authenticated in the user authentication.

10. The authentication processing method according to claim 6, further comprising acquiring, by the operating body via a network, from a server device in which information that serves as a source for generating the second priority user information is registered, the information that serves as said source, and generating the second priority user information.

11. A computer program product comprising a non-transitory computer-readable recording medium that contains an authentication processing program, wherein the authentication processing program, when executed, causes a computer of a main body to perform a method comprising:

provide a predetermined function to be performed, amongst plural predetermined functions;

generate authentication information to be used for user authentication, and register, in a first storage device, the generated authentication information to be used for user authentication; and provide the predetermined function amongst the plural predetermined functions to be performed when a user authentication result indicating that a specified user is an authorized user is obtained; and the authentication processing program, when executed, causes a computer of an operating body to:

acquire from the first storage device before performance of a user authentication process, the authentication information registered in the first storage device;

register, in a second storage device, the acquired authentication information;

generate first priority user information and register the first priority user information in the second storage device, the first priority user information including, amongst the acquired authentication information, specified authentication information corresponding to a specified user amongst recently-authenticated users each having been recently authenticated as an authorized user, the specified authentication information for each user in the first priority user information including corresponding user authentication time information;

install in the second storage device, a program that becomes usable by the user upon authentication of the user as an authorized user;

generate second priority user information separately from the first priority user information and register the second priority user information in the second storage device, the second priority user information specifying recently-authenticated users each having been recently authenticated as an authorized user of the installed program;

acquire input information that is input in the user authentication process; and perform the user authentication process, including collating the input information with the first priority user information or the second priority user information registered in the second storage device, to obtain a user authentication result of the user authentication process, and in a case that the input information is collated with the first priority user information, notifying the first unit main body of the user authentication result, and in a case that the input information is collated with the second priority user information and the user authentication result indicates that the specified user is an authorized user, providing the program installed in the second storage device, to be used by the authorized user, wherein the method further comprises disabling, by the operating body, while the program is installed, the first priority user information and enabling the second priority user information.

* * * * *